US012613093B2

(12) United States Patent　　　　(10) Patent No.:　US 12,613,093 B2
Katsura et al.　　　　　　　　　　　(45) Date of Patent:　　Apr. 28, 2026

(54) FILLING RATE MEASUREMENT METHOD, INFORMATION PROCESSING DEVICE, AND RECORDING MEDIUM

(71) Applicant: Panasonic Intellectual Property Management Co., Ltd., Osaka (JP)

(72) Inventors: Ukyou Katsura, Osaka (JP); Toru Matsunobu, Osaka (JP); Satoshi Yoshikawa, Hyogo (JP); Masaki Fukuda, Osaka (JP); Kensho Teranishi, Osaka (JP); Tomokazu Ichiriki, Kanagawa (JP); Masanori Kimura, Osaka (JP); Toshiyasu Sugio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 430 days.

(21) Appl. No.: 18/113,223

(22) Filed: Feb. 23, 2023

(65) Prior Publication Data

US 2023/0213371 A1　　Jul. 6, 2023

Related U.S. Application Data

(63) Continuation of application No. PCT/JP2021/029882, filed on Aug. 16, 2021.

(30) Foreign Application Priority Data

Sep. 8, 2020　(JP) .................................. 2020-150437

(51) Int. Cl.
　　*G01B 11/24*　　　(2006.01)
　　*G01B 11/00*　　　(2006.01)
　　*G06T 7/62*　　　　(2017.01)

(52) U.S. Cl.
　　CPC .............. *G01B 11/24* (2013.01); *G01B 11/00* (2013.01); *G06T 7/62* (2017.01); *G06T 2207/10024* (2013.01); *G06T 2207/10028* (2013.01)

(58) Field of Classification Search
　　None
　　See application file for complete search history.

(56) References Cited

U.S. PATENT DOCUMENTS

| | | |
|---|---|---|
| 2010/0017407 A1 | 1/2010 | Beniyama et al. |
| 2017/0178333 A1 | 6/2017 | Zhang et al. |

(Continued)

FOREIGN PATENT DOCUMENTS

| | | |
|---|---|---|
| JP | 2010-023950 A | 2/2010 |
| JP | 2015-87319 | 5/2015 |

(Continued)

OTHER PUBLICATIONS

International Search Report (ISR) issued on Oct. 19, 2021 in International (PCT) Application No. PCT/JP2021/029882.

*Primary Examiner* — Vladimir Magloire
*Assistant Examiner* — Ashley Brown Raynal
(74) *Attorney, Agent, or Firm* — Wenderoth, Lind & Ponack, L.L.P.

(57) ABSTRACT

A filling rate measurement method includes: obtaining a space three-dimensional model generated by measuring a storage through an opening of the storage using a range sensor facing the storage; obtaining a storage three-dimensional model that is a three-dimensional model of the storage; extracting a target part that is a part of a measurement target in the space three-dimensional model; identifying a line segment indicating a shape of the opening on a two-dimensional image of the opening which is generated; estimating a target three-dimensional model that is a three-dimensional model of the measurement target based on the (Continued)

target part and a three-dimensional coordinate system with respect to the position of the opening on a three-dimensional space identified based on the position of the range sensor, the specific direction, and the shape of the opening; and calculating a filling rate of the measurement target with respect to the storage space.

16 Claims, 35 Drawing Sheets

(56) References Cited

U.S. PATENT DOCUMENTS

| | | | | |
|---|---|---|---|---|
| 2020/0118063 A1 * | 4/2020 | Fu | ............................ | G06F 15/76 |
| 2022/0180560 A1 * | 6/2022 | Nakano | ...................... | G06T 3/40 |

FOREIGN PATENT DOCUMENTS

| | | | | |
|---|---|---|---|---|
| JP | 2019-514240 A | 5/2019 | | |
| JP | 6605711 | 11/2019 | | |
| WO | 2017/151669 A1 | 9/2017 | | |
| WO | 2017/175312 | 10/2017 | | |
| WO | WO-2017175312 A1 * | 10/2017 | ............. | B65G 1/137 |
| WO | WO-2019141318 A1 * | 7/2019 | ............. | B23P 19/047 |

* cited by examiner

| ID | Filling rate |
|-----|-----|
| 200 | 70% |
| 201 | 30% |
| 202 | 20% |

113

112

2051

103

R3

FILLING RATE MEASUREMENT METHOD, INFORMATION PROCESSING DEVICE, AND RECORDING MEDIUM

CROSS REFERENCE TO RELATED APPLICATIONS

This is a continuation application of PCT International Application No. PCT/JP2021/029882 filed on Aug. 16, 2021, designating the United States of America, which is based on and claims priority of Japanese Patent Application No. 2020-150437 filed on Sep. 8, 2020. The entire disclosures of the above-identified applications, including the specifications, drawings and claims are incorporated herein by reference in their entirety.

FIELD

The present disclosure relates to a filling rate measurement method, an information processing device, and a recording medium.

BACKGROUND

Patent Literature (PTL) 1 discloses a three-dimensional shape measuring device that obtains a three-dimensional shape using a three-dimensional laser scanner.

CITATION LIST

Patent Literature

PTL 1: Japanese Unexamined Patent Application Publication No. 2015-87319

SUMMARY

Technical Problem

There are no sufficient discussions about examples of application of measured three-dimensional shapes. For example, there are no sufficient discussions about calculation of a filling rate that indicates how many measurement targets are stored in a prescribed storage space.

The present disclosure provides a filling rate measurement method capable of calculating a filling rate of a measurement target, and the like.

Solution to Problem

In accordance with an aspect of the present disclosure, a filling rate measurement method includes: obtaining a space three-dimensional model generated by measuring a storage including an opening and a storage space in which a measurement target is to be stored, the measuring being performed through the opening using a range sensor facing the storage; obtaining a storage three-dimensional model that is a three-dimensional model of the storage in which the measurement target is not stored; obtaining a two-dimensional image of the opening and position orientation information corresponding to the two-dimensional image; identifying a line segment indicating a shape of the opening in the two-dimensional image, using the storage three-dimensional model; calculating a position of the opening in a three-dimensional space, based on the position orientation information and the line segment identified; associating a position of the storage three-dimensional model with a position of the space three-dimensional model based on the calculated position of the opening; estimating a target three-dimensional model that is a three-dimensional model of the measurement target in the storage space, based on the storage three-dimensional model and the space three-dimensional model associated with each other; and calculating a filling rate of the measurement target with respect to the storage space, using the storage three-dimensional model and the target three-dimensional model.

In accordance with another aspect of the present disclosure, an information processing device includes: a processor; and a memory, wherein, using the memory, the processor: obtains a space three-dimensional model generated by measuring a storage including an opening and a storage space in which a measurement target is to be stored, the measuring being performed through the opening using a range sensor facing the storage; obtains a storage three-dimensional model that is a three-dimensional model of the storage in which the measurement target is not stored; obtains a two-dimensional image of the opening and position orientation information corresponding to the two-dimensional image; identifies a line segment indicating a shape of the opening in the two-dimensional image, using the storage three-dimensional model; calculates a position of the opening in a three-dimensional space, based on the position orientation information and the line segment identified; associates a position of the storage three-dimensional model with a position of the space three-dimensional model based on the calculated position of the opening; estimates a target three-dimensional model that is a three-dimensional model of the measurement target in the storage space, based on the storage three-dimensional model and the space three-dimensional model associated with each other; and calculates a filling rate of the measurement target with respect to the storage space, using the storage three-dimensional model and the target three-dimensional model.

It should be noted that the present disclosure may be implemented to a program that causes a computer to execute the steps included in the above-described filing rate measurement method. Furthermore, the present disclosure may be implemented to a non-transitory computer-readable recording medium, such as a Compact Disc-Read Only Memory (CD-ROM), on which the program is recorded. The present disclosure may be implemented to information, data, or signals indicating the program. The program, the information, the data, and the signals may be distributed via a communication network, such as the Internet.

Advantageous Effects

According to the present disclosure, a filling rate measurement method capable of calculating a filling rate of a measurement target, and the like can be provided.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
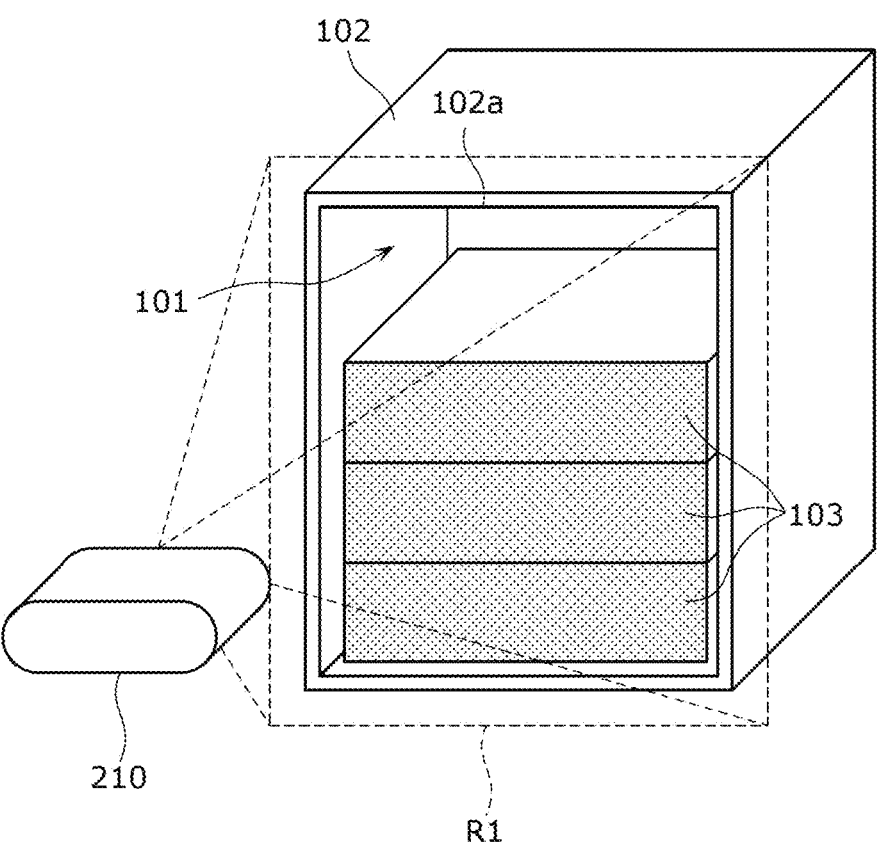
FIG. 1 is a diagram for describing an outline of a filling rate measurement method according to Embodiment 1.

DESCRIPTION OF EMBODIMENTS (Circumstances Leading to the Present Disclosure)

There is a demand for measuring a filling rate of a measurement target such as baggage with respect to a storage space to improve an efficiency of use of the storage space in a distribution site. Further, since measurement targets are to be stored in many storages such as containers in a distribution site, there is a demand for measuring as many filling rates in a short time as possible. However, there are no sufficient discussions about a method for measuring a filling rate easily.

Therefore, the present disclosure provides a filling rate measurement method for easily calculating as many filling rates of storages in a short time as possible by applying a technique of generating a three-dimensional model to a storage in which a measurement target is stored.

In accordance with an aspect of the present disclosure, a filling rate measurement method includes: obtaining a space three-dimensional model generated by measuring a storage including an opening and a storage space in which a measurement target is to be stored, the measuring being performed through the opening using a range sensor facing the storage; obtaining a storage three-dimensional model that is a three-dimensional model of the storage in which the measurement target is not stored; obtaining a two-dimensional image of the opening and position orientation information corresponding to the two-dimensional image; identifying a line segment indicating a shape of the opening in the two-dimensional image, using the storage three-dimensional model; calculating a position of the opening in a three-dimensional space, based on the position orientation information and the line segment identified; associating a position of the storage three-dimensional model with a position of the space three-dimensional model based on the calculated position of the opening; estimating a target three-dimensional model that is a three-dimensional model of the measurement target in the storage space, based on the storage three-dimensional model and the space three-dimensional model associated with each other; and calculating a filling rate of the measurement target with respect to the storage space, using the storage three-dimensional model and the target three-dimensional model.

According to this aspect, the target three-dimensional model of the measurement target is estimated using (i) a three-dimensional coordinate system based on the position of the opening and (ii) an estimated target three-dimensional model. Therefore, the filling rate of the measurement target with respect to the storage space can be calculated easily only by measuring the storage in which the measurement target is stored.

Furthermore, it is possible that the two-dimensional image includes a Red Green Blue (RGB) image generated by imaging the opening by a camera, and the position orientation information indicates a position and an orientation of the camera at a time of the imaging of the opening.

Furthermore, it is possible that the two-dimensional image includes a depth image generated based on measuring of the opening by the range sensor, and the position orientation information indicates a position and an orientation of the range sensor at a time of the measuring of the opening.

Furthermore, it is possible that the two-dimensional image includes at least one of an RGB image, a grayscale image, an infrared image, or a depth image, the RGB image is generated by imaging the opening by a camera, and the depth image is generated based on a result of the measuring performed by the range sensor.

Therefore, it is possible to accurately extract a line segment indicating the shape of the opening.

Furthermore, it is possible that in the identifying of the line segment, the line segment is identified based on both a line segment identified from the RGB image and a line segment identified from the depth image.

Furthermore, it is possible that the range sensor includes at least one of a Time of Flight (ToF) sensor or a stereo camera.

Furthermore, it is possible that the range sensor includes a first range sensor and a second range sensor, and a first measurement region of the first range sensor and a second measurement region of the second range sensor having an overlapping region in which the first measurement region and the second measurement region overlap each other.

Therefore, the measurement target can be measured in a wider range.

Furthermore, it is possible that the overlapping region has a length greater than or equal to a length of the measurement target in a measuring direction of the range sensor.

Therefore, the measurement target can be measured in a wider range.

Furthermore, it is possible that the overlapping region includes an entire range in which the measurement target is present.

Therefore, a space three-dimensional model with less occlusion can be generated.

Furthermore, it is possible that the storage moves relative to the range sensor in a direction intersecting a measuring direction of the range sensor, and the space three-dimensional model is generated using a first measurement result measured at a first timing by the range sensor and a second measurement result measured at a second timing by the range sensor.

Therefore, a space three-dimensional model with less occlusion can be generated.

Furthermore, it is possible that the position of the storage three-dimensional model and the position of the space three-dimensional model are associated with each other using a rotation matrix and a translational vector.

Furthermore, it is possible that the above-described filling rate measurement method further includes: calculating a second filling rate of one or more storages with respect to a second storage including a second storage space in which the one or more storages are to be stored, the one or more storages each being the storage.

Furthermore, it is possible that the above-described filling rate measurement method further includes: calculating a third filling rate of the measurement target stored in each of one or more storages each being the storage with respect to a second storage including a second storage space in which the one or more storages are to be stored, the one or more storages each being the storage.

In accordance with another aspect of the present disclosure, an information processing device includes: a processor; and a memory, wherein, using the memory, the processor: obtains a space three-dimensional model generated by measuring a storage including an opening and a storage space in which a measurement target is to be stored, the measuring being performed through the opening using a range sensor facing the storage; obtains a storage three-dimensional model that is a three-dimensional model of the storage in which the measurement target is not stored; obtains a two-dimensional image of the opening and position orientation information corresponding to the two-dimensional image; identifies a line segment indicating a shape of the opening in the two-dimensional image, using the storage three-dimensional model; calculates a position of the opening in a three-dimensional space, based on the position orientation information and the line segment identified; associates a position of the storage three-dimensional model with a position of the space three-dimensional model based on the calculated position of the opening; estimates a target three-dimensional model that is a three-dimensional model of the measurement target in the storage space, based on the storage three-dimensional model and the space three-dimensional model associated with each other; and calculates a filling rate of the measurement target with respect to the storage space, using the storage three-dimensional model and the target three-dimensional model.

According to this aspect, the target three-dimensional model of the measurement target is estimated using (i) a three-dimensional coordinate system based on the position of the opening and (ii) an estimated target three-dimensional model. Therefore, the filling rate of the measurement target with respect to the storage space can be calculated easily only by measuring the storage in which the measurement target is stored.

It should be noted that the present disclosure may be implemented to a program that causes a computer to execute the steps included in the above-described filling rate measurement method. Furthermore, the present disclosure may be implemented to a non-transitory computer-readable recording medium, such as a Compact Disc-Read Only Memory (CD-ROM), on which the program is recorded. The present disclosure may be implemented to information, data, or signals indicating the program. The program, the information, the data, and the signals may be distributed via a communication network, such as the Internet.

Hereinafter, exemplary embodiments of the three-dimensional model generation method and the like according to the present disclosure will be described in detail with reference to the accompanying Drawings. The following embodiments are examples of the present disclosure. The numerical values, shapes, materials, elements, arrangement and connection configuration of the elements, steps, the order of the steps, etc., described in the following embodiments are merely examples, and are not intended to limit the present disclosure.

It should be noted that the respective figures are schematic diagrams and are not necessarily precise illustrations. Additionally, components that are essentially the same share like reference signs in the figures. Accordingly, overlapping explanations thereof are omitted or simplified.

Embodiment 1

With reference to FIG. 1, an outline of a filling rate measurement method according to Embodiment 1 will be described.

FIG. 1 is a diagram for describing the outline of the filling rate measurement method according to Embodiment 1.

In the filling rate measurement method, as illustrated in FIG. 1, baggage 103 stored in rack 102 that includes storage space 101 is measured with range sensor 210. Then, using results of measurement obtained, a filling rate of baggage 103 with respect to storage space 101 is calculated. Rack 102 is formed with opening 102a through which baggage 103 is put into or taken out from storage space 101. Range sensor 210 is disposed at a location facing opening 102a of rack 102 in an orientation that allows range sensor 210 to measure rack 102 having opening 102a and measures measurement region R1, which contains an inside of storage space 101, through opening 102a.

Rack 102 has, for example, a box shape as illustrated in FIG. 1. Rack 102 need not have a box shape as long as the rack has a configuration in which the rack includes a placement surface on which baggage 103 is placed and includes, over the placement surface, storage space 101 where baggage 103 is stored. Rack 102 is an example of a storage. Storage space 101 is an example of a storage space. Although storage space 101 is configured to be an internal space included in rack 102, storage space 101 is not limited to the internal space and may be a space in a storehouse where measurement targets such as baggage 103 are stored. Baggage 103 is an example of the measurement targets. The measurement targets are not limited to baggage 103 and may be goods. That is, the measurement targets may be any bodies as long as they are transportable.

Figure 2:
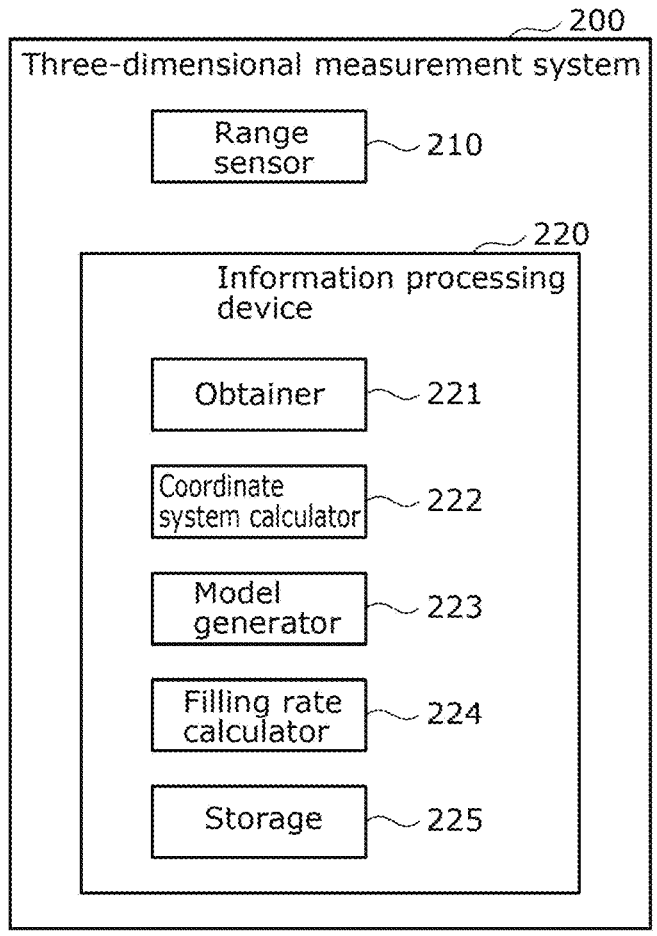
FIG. 2 is a block diagram illustrating a characteristic configuration of a three-dimensional measurement system according to Embodiment 1.
Figure 3:
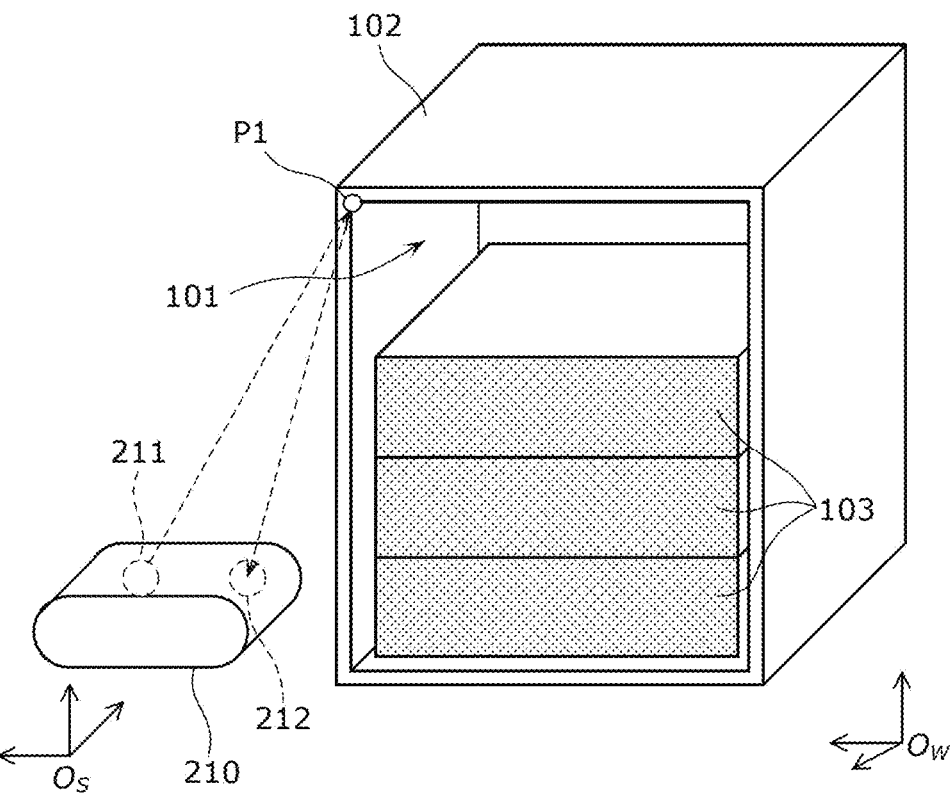
FIG. 3 is a diagram for describing a first example of a configuration of a range sensor.
Figure 4:
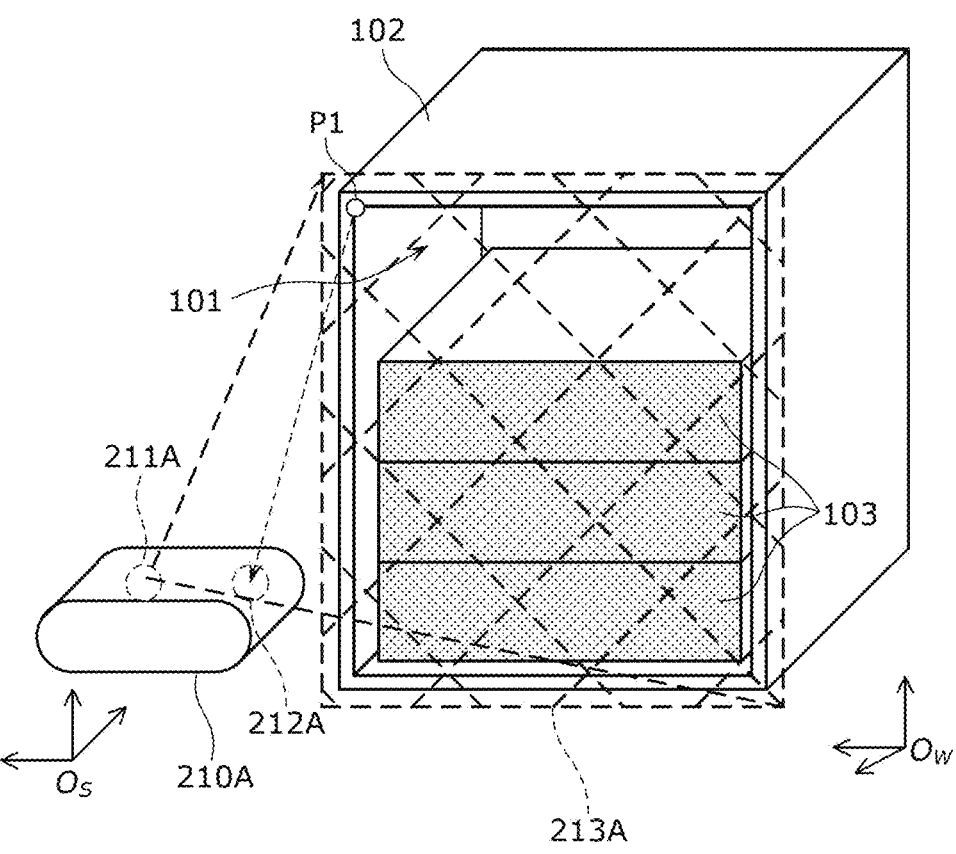
FIG. 4 is a diagram for describing a second example of the configuration of the range sensor.
Figure 5:
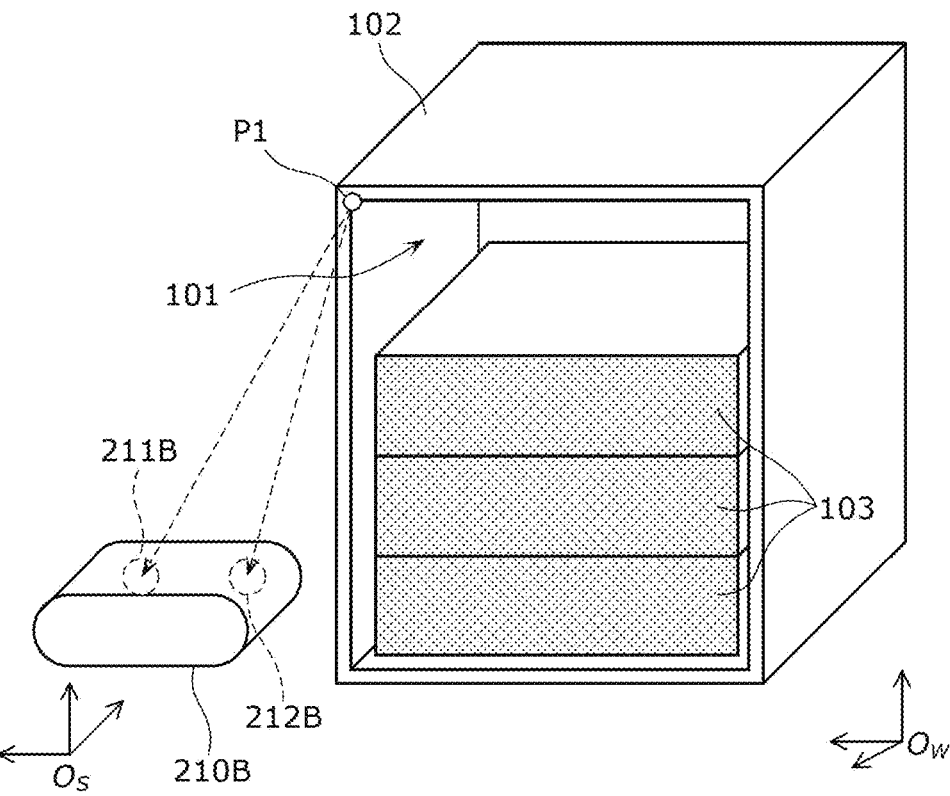
FIG. 5 is a diagram for describing a third example of the configuration of the range sensor.

FIG. 2 is a block diagram illustrating a characteristic configuration of a three-dimensional measurement system according to Embodiment 1. FIG. 3 is a diagram for describing a first example of a configuration of the range sensor. FIG. 4 is a diagram for describing a second example of the configuration of the range sensor. FIG. 5 is a diagram for describing a third example of the configuration of the range sensor.

As illustrated in FIG. 2, three-dimensional measurement system 200 includes range sensor 210 and information processing device 220. Three-dimensional measurement system 200 may include range sensors 210 or may include one range sensor 210.

Range sensor 210 measures a three-dimensional space including a storage space of rack 102 via opening 102a of rack 102, thus obtaining results of measurement including rack 102 and storage space 101 of rack 102. Specifically, range sensor 210 generates a space three-dimensional model represented as a group of three-dimensional points that indicate three-dimensional positions of measurement points on rack 102 or baggage 103 (hereinafter, referred to as measurement target) (on a surface of the measurement target). The group of the three-dimensional points is called three-dimensional point cloud. Three-dimensional positions indicated by three-dimensional points in a three-dimensional point cloud are each represented as, for example, a set of coordinates of three-value information consisting of an X component, a Y component, and a Z component in a three-dimensional coordinate space formed by XYZ axes. It should be noted that the three-dimensional model may include not only sets of three-dimensional coordinates but also color information items each indicating a color of a point or shape information items each representing a point and a surface shape around the point. The color information items may be each represented in, for example, an RGB color space or another color space such as HSV, HLS, and YUV.

A concrete example of range sensor 210 will be described with reference to FIG. 3 to FIG. 5.

As illustrated in FIG. 3, range sensor 210 in the first example emits electromagnetic waves and obtains reflected waves that are the electromagnetic waves reflected at a measurement target, thus generating a space three-dimensional model. Specifically, range sensor 210 measures a time taken by an emitted electromagnetic wave to be reflected at the measurement target and return to range sensor 210 from the emission and calculates a distance between range sensor 210 and point P1 on a surface of the measurement target using the measured time and a wavelength of the electromagnetic wave used for the measurement. Range sensor 210 emits electromagnetic waves from a reference point of range sensor 210 in predetermined radial directions. For example, range sensor 210 may emit electromagnetic waves in horizontal directions at first angular intervals and emit electromagnetic waves in vertical directions at second angular intervals. Therefore, by detecting a distance between range sensor 210 and the measurement target in each of directions from range sensor 210, range sensor 210 can calculate sets of three-dimensional coordinates of points on the measurement target. Range sensor 210 thus can calculate position information items indicating three-dimensional positions on the measurement target and can generate a space three-dimensional model including the position information items. The position information items may be a three-dimensional point cloud including three-dimensional points that indicate the three-dimensional positions.

As illustrated in FIG. 3, range sensor 210 in the first example is a three-dimensional laser measuring instrument including laser emitter 211 that emits laser light beams as the electromagnetic waves and laser receiver 212 that receives reflected light beams that are the emitted laser light beams reflected at a measurement target. Range sensor 210 scans the measurement target with laser light by rotating or swinging a unit including laser emitter 211 and laser receiver 212 about two different axes or by means of a movable mirror that swings about two axes (micro electro mechanical systems (MEMS) mirror) placed in a route of a laser beam emitted or to be received. This enables range sensor 210 to generate a high-precision, high-density three-dimensional model of the measurement target.

Although a three-dimensional laser measuring instrument that measures a distance from a measurement target by emitting laser light beams is exemplified as range sensor 210, range sensor 210 is not limited to this; range sensor 210 may be a millimeter-wave radar measuring instrument, which measured a distance from a measurement target by emitting millimeter waves.

Range sensor 210 may generate a three-dimensional model including color information. First color information items are color information items that are generated from images captured by range sensor 210 and indicate colors of first three-dimensional points included in a first three-dimensional point cloud.

Specifically, range sensor 210 may include a camera built therein that images a measurement target present around range sensor 210. The camera built in range sensor 210 images a region including an emission range of laser light beams emitted by range sensor 210, thus generating images. It should be noted that the camera is not necessarily built in range sensor 210, but may be located outside range sensor 210. The camera located outside range sensor 210 may be disposed at the same position as the position at which range sensor 210 is disposed. An imaging range imaged by the camera is associated in advance with the emission range. Specifically, directions in which laser light beams are emitted by range sensor 210 are associated in advance with pixels in an image captured by the camera, and range sensor 210 sets, as color information items indicating colors of three-dimensional points included in a three-dimensional point cloud, pixel values in the image associated with directions of the three-dimensional points.

As illustrated in FIG. 4, range sensor 210A in the second example is a range sensor based on a structured light method. Range sensor 210A includes infrared pattern emitter 211A and infrared camera 212A. Infrared pattern emitter 211A projects infrared pattern 213A, which is predetermined, onto a surface of a measurement target. Infrared camera 212A images the measurement target onto which infrared pattern 213A is projected, thereby obtaining an infrared image. Range sensor 210A searches infrared pattern 213A included in the obtained infrared image and calculates a distance from infrared pattern emitter 211A or infrared camera 212A to point P1 in the infrared pattern on the measurement target in real space based on a triangle formed by connecting three positions including a position of point P1 on the measurement target, a position of infrared pattern emitter 211A, and a position of infrared camera 212A. This enables range sensor 210A to obtain a three-dimensional position of a measurement point on the measurement target.

Range sensor 210A can obtain a high-density three-dimensional model by moving a unit of range sensor 210A including infrared pattern emitter 211A and infrared camera 212A or by making the infrared pattern emitted by infrared pattern emitter 211A have a fine texture.

Further, using a visible light range of color information that can be obtained by infrared camera 212A, range sensor 210A may generate a three-dimensional model including color information items by associating the obtained visible light range with three-dimensional points with consideration given to a position or an orientation of infrared pattern emitter 211A or infrared camera 212A. Alternatively, range sensor 210A may have a configuration further including a visible light camera for adding color information.

As illustrated in FIG. 5, range sensor 210B in the third example is a range sensor that measures three-dimensional points by stereo camera measurement. Range sensor 210B is a stereo camera that includes two cameras 211B and 212B. By imaging a measurement target with two cameras 211B and 212B at a synchronized timing, range sensor 210B obtains stereo images with parallax. Using the obtained stereo images (two images), range sensor 210B performs a matching process for a feature point on the two images, thus obtaining alignment information of the two images with pixel precision or sub-pixel precision. Based on a triangle formed by connecting a matched position of point P1 on a measurement target in real space and positions of two cameras 211B and 212B, range sensor 210B calculates a distance from any one of two cameras 211B and 212B to the matched position on the measurement target (i.e., point P1). This enables range sensor 210B to obtain a three-dimensional position of a measurement point on the measurement target.

Range sensor 210B can obtain a high-precision three-dimensional model by moving a unit of range sensor 210B including two cameras 211B and 212B or by increasing the number of cameras provided in range sensor 210B to three or more, imaging the same measurement target and performing the matching process.

Alternatively, using visible light cameras as cameras 211B and 212B included in range sensor 210B can make it easy to add color information to the obtained three-dimensional model.

It should be noted that the present embodiment will be described with an example in which information processing device 220 includes range sensor 210 in the first example, but information processing device 220 may have a configuration including range sensor 210A in the second example or range sensor 210B in the third example in place of range sensor 210 in the first example.

Two cameras 211B and 212B are capable of capturing monochrome images including visible light images or infrared images. In this case, the matching process on the two images by three-dimensional measurement system 200 may be performed using, for example, Simultaneous Localization And Mapping (SLAM) or Structure from Motion (SfM). Further, using information indicating positions and orientations of cameras 211B and 212B obtained by performing this process, a point cloud density of a measurement space model may be increased by Multi View Stereo (MVS).

Referring back to FIG. 2, a configuration of information processing device 220 will be described.

Information processing device 220 includes obtainer 221, coordinate system calculator 222, model generator 223, filling rate calculator 224, and storage 225.

Obtainer 221 obtains a space three-dimensional model and an image generated by range sensor 210. Specifically, obtainer 221 may obtain a space three-dimensional model and an image from range sensor 210. The space three-dimensional model and the image obtained by obtainer 221 may be stored in storage 225.

Coordinate system calculator 222 calculates a positional relation between range sensor 210 and rack 102 using the space three-dimensional model and the image. Coordinate system calculator 222 thereby calculates a measurement coordinate system based on a shape of a part of rack 102. Coordinate system calculator 222 may calculate a measurement coordinate system based only on the shape of the part of rack 102. Specifically, as the shape of the part based on which the measurement coordinate system is calculated, coordinate system calculator 222 calculates the measurement coordinate system based on a shape of opening 102a of rack 102. In a case where the shape of opening 102a is rectangular as illustrated in Embodiment 1, the shape of opening 102a based on which the measurement coordinate system is calculated may be a corner of the shape of opening 102a or may be a side of the shape of opening 102a.

It should be noted that the measurement coordinate system is a three-dimensional orthogonal coordinate system and is an example of a first three-dimensional coordinate system. By calculating the measurement coordinate system, a relative position and a relative orientation of range sensor 210 based on rack 102 can be determined. That is, this enables a sensor coordinate system of range sensor 210 to be aligned with the measurement coordinate system, thus enabling calibration between rack 102 and range sensor 210. It should be noted that the sensor coordinate system is a three-dimensional orthogonal coordinate system.

It should be noted that, in the present embodiment, rack 102 having a rectangular-parallelepiped shape includes opening 102a at one face of rack 102, but rack 102 is not limited to this. The rack may have a configuration in which openings are provided at faces of the rectangular-parallelepiped shape such as a configuration with openings at two faces including a front face and a rear face, and a configuration with openings at two faces including a front face and a top face. In a case where the rack includes openings, prescribed reference positions described later may be set to one of the openings. The prescribed reference positions may be set in a space where neither three-dimensional point nor voxel of a storage three-dimensional model being the three-dimensional model of rack 102 is present.

Here, coordinate system calculator 222 in the first example will be described with reference to FIG. 6 and FIG. 7.

Figure 6:
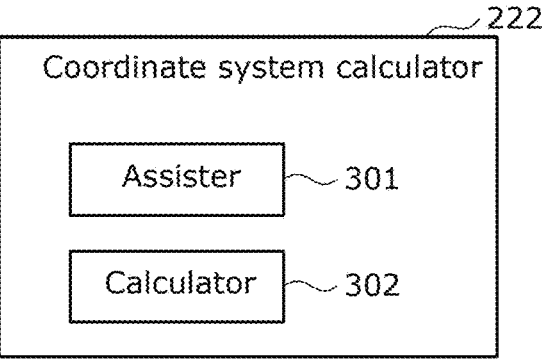
FIG. 6 is a block diagram illustrating a configuration of a coordinate system calculator in the first example.

FIG. 6 is a block diagram illustrating a configuration of the coordinate system calculator in the first example. FIG. 7 is a diagram for describing a method for calculating a measurement coordinate system by the coordinate system calculator in the first example.

Coordinate system calculator 222 calculates the measurement coordinate system. The measurement coordinate system is a three-dimensional coordinate system that serves as a reference for a space three-dimensional model. For example, range sensor 210 is placed at an origin of the measurement coordinate system and placed in an orientation in which range sensor 210 directly faces opening 102a of rack 102. At this time, the measurement coordinate system may be such that an upward direction of range sensor 210 is set as an X axis, a rightward direction is set as a Y axis, and a frontward direction is set as a Z axis. Coordinate system calculator 222 includes assister 301 and calculator 302.

Figure 7:
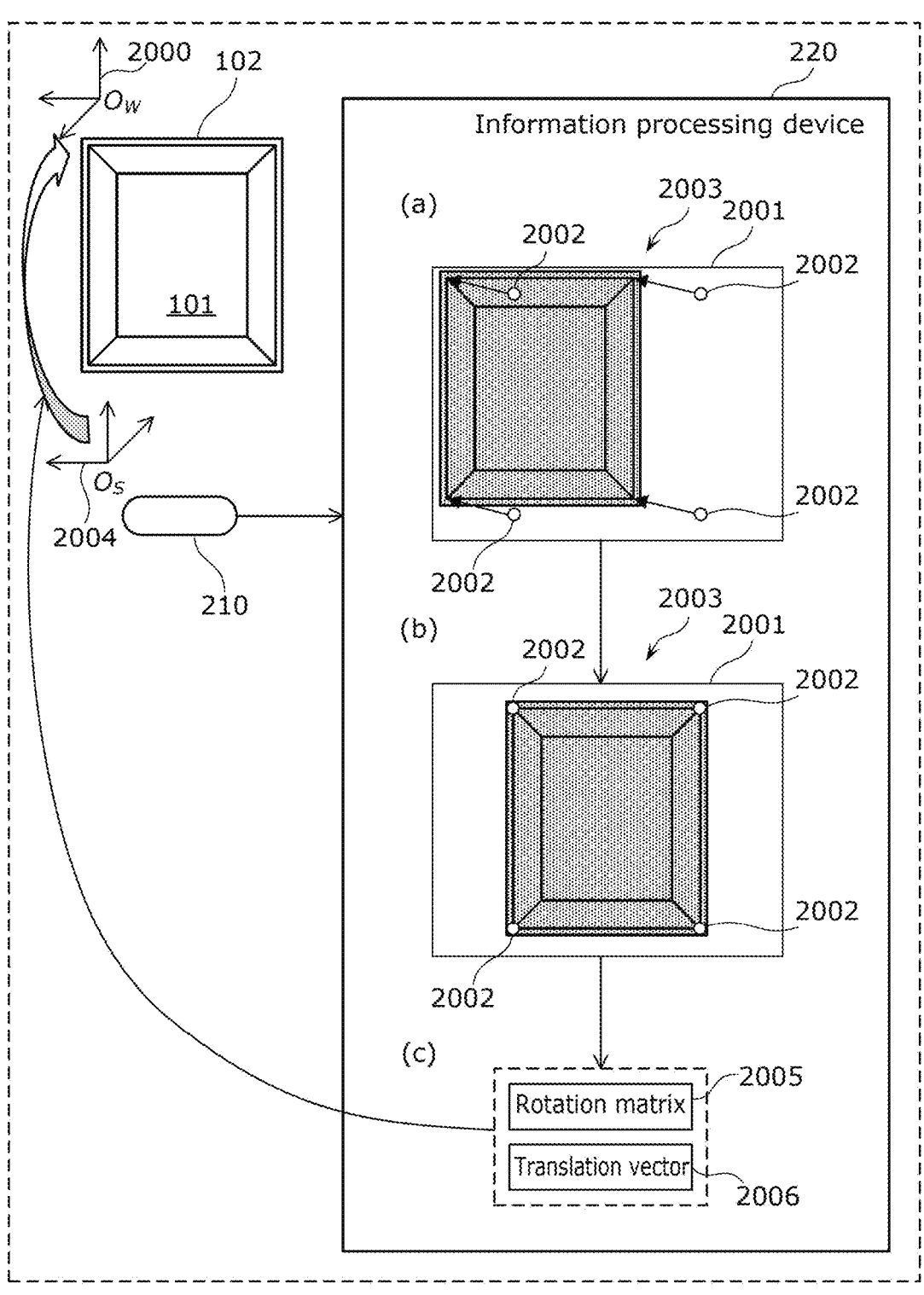
FIG. 7 is a diagram for describing a method for calculating a measurement coordinate system by the coordinate system calculator in the first example.

As illustrated in (a) of FIG. 7, assister 301 successively obtains images 2001, which are results of measurement by range sensor 210 obtained by obtainer 221, in real time, and superimposes adjustment markers 2002 on each of images 2001 successively obtained. Assister 301 successively outputs superimposed images 2003 in each of which adjustment marker 2002 is superimposed on image 2001, to a display device not illustrated. The display device successively displays superimposed images 2003 output from information processing device 220. It should be noted that assister 301 and the display device may be integrated together in range sensor 210.

Adjustment markers 2002 are markers for assisting a user in moving range sensor 210 such that a position and an orientation of range sensor 210 with respect to rack 102 become a specific position and a specific orientation. The user can dispose range sensor 210 such that range sensor 210 takes the specific position and the specific orientation with respect to rack 102 by changing the position and the orientation of range sensor 210 while watching superimposed images 2003 displayed on the display device such that adjustment markers 2002 match the prescribed reference positions on rack 102. The prescribed reference positions on rack 102 are, for example, positions of four corners of quadrilateral opening 102a of rack 102.

When range sensor 210 is disposed at the specific position and in the specific orientation with respect to rack 102, superimposed images 2003 in which four adjustment markers 2002 are superimposed at four positions corresponding to the positions of the four corners of opening 102a of rack 102 are generated. For example, by moving range sensor 210 such that adjustment markers 2002 move in directions of arrows illustrated in (a) of FIG. 7, the user can align four adjustment markers 2002 with the positions of the four corners of opening 102a as illustrated in (b) of FIG. 7.

Although assister 301 is configured to superimpose adjustment markers 2002 on image 2001, adjustment markers may be superimposed on a space three-dimensional model, and the space three-dimensional model on which the adjustment markers are superimposed may be displayed on the display device.

As illustrated in (c) of FIG. 7, calculator 302 calculates rotation matrix 2005 and translation vector 2006 that indicate a positional relation between rack 102 and range sensor 210 at a time when four adjustment markers 2002 are aligned with the positions of the four corners of opening 102a. Calculator 302 converts sensor coordinate system 2004 of range sensor 210 using rotation matrix 2005 and translation vector 2006 calculated, thus calculating measurement coordinate system 2000, of which an origin is a given corner (one of the four corners) of opening 102a. Thereby, calculator 302 can associate the position of the storage three-dimensional model with the position of the space three-dimensional model. When four adjustment markers 2002 are aligned with the positions of the four corners of opening 102a, the user may make an input into an input device not illustrated. By obtaining a time when the input from the input device, information processing device 220 may determine a time when four adjustment markers 2002 are aligned with the positions of the four corners of opening 102a. Further, by analyzing image 2001, information processing device 220 may determine whether four adjustment markers 2002 have been aligned with the positions of the four corners of opening 102a.

Next, coordinate system calculator 222A in the second example will be described with reference to FIG. 8 and FIG. 9.

Figure 8:
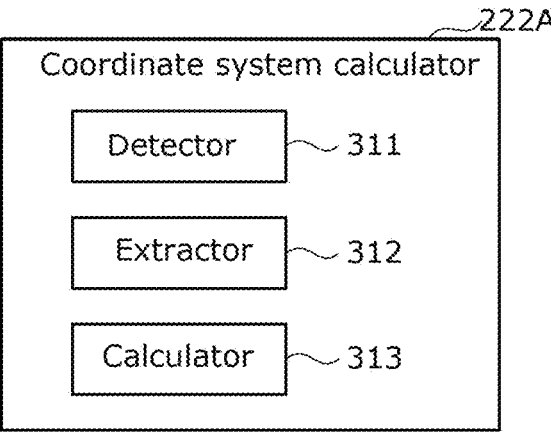
FIG. 8 is a block diagram illustrating a configuration of a coordinate system calculator in the second example.

FIG. 8 is a block diagram illustrating a configuration of the coordinate system calculator in the second example. FIG. 9 is a diagram for describing a method for calculating a measurement coordinate system by the coordinate system calculator in the second example.

Coordinate system calculator 222A includes detector 311, extractor 312, and calculator 313.

Figure 9:
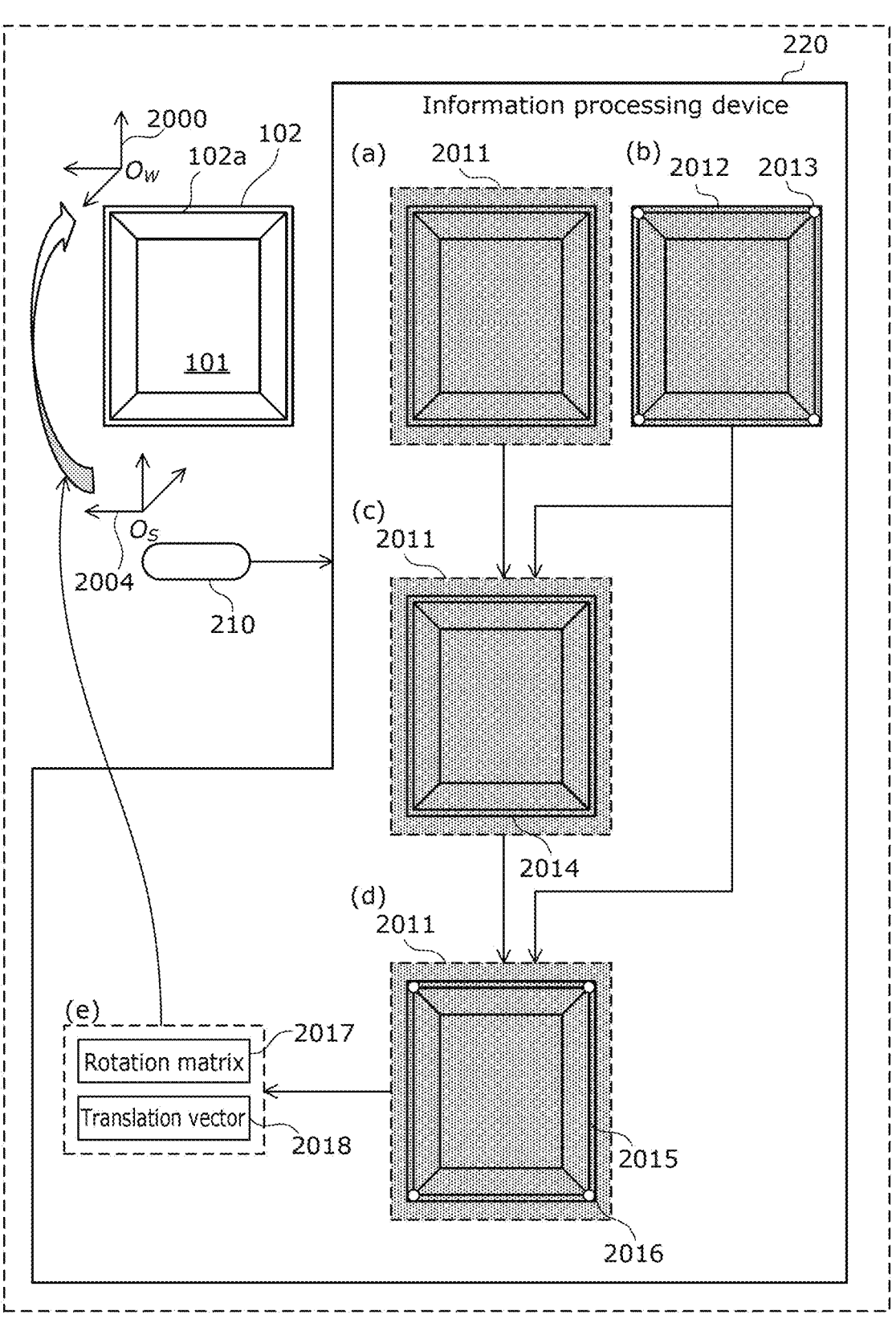
FIG. 9 is a diagram for describing a method for calculating a measurement coordinate system by the coordinate system calculator in the second example.

Using space three-dimensional model 2011, which is a result of measurement illustrated in (a) of FIG. 9 from range sensor 210 obtained by obtainer 221, and storage three-dimensional model 2012 illustrated in (b) of FIG. 9, detector 311 detects rack region 2014 corresponding to rack 102 as illustrated in (c) of FIG. 9. Storage three-dimensional model 2012 is a three-dimensional model of rack 102 where no baggage 103 is stored, and storage three-dimensional model 2012 is a three-dimensional model that is generated in advance using results of measurement, by range sensor 210, on rack 102 at the time when no baggage 103 is stored. Storage three-dimensional model 2012 is generated by model generator 223 described later and is stored in storage 225. Storage three-dimensional model 2012 may include position information 2013 that indicates positions of four corners of opening 102*a* of rack 102.

As illustrated in (d) of FIG. 9, using position information 2013 in storage three-dimensional model 2012, extractor 312 extracts four opening endpoints 2016, which are positions of four corners of opening 2015 in rack region 2014. A shape of opening 2015 defined by four opening endpoints 2016 is an example of a shape of a part based on which a measurement coordinate system is calculated.

As illustrated in (e) of FIG. 9, calculator 313 calculates rotation matrix 2017 and translation vector 2018 that indicate a positional relation between range sensor 210 and rack 102 based on the shape of four opening endpoints 2016 as viewed from range sensor 210. Calculator 313 converts sensor coordinate system 2004 of range sensor 210 using rotation matrix 2017 and translation vector 2018, thus calculating measurement coordinate system 2000. Thereby, calculator 313 can associate the position of the storage three-dimensional model with the position of the space three-dimensional model. Specifically, when rotation matrix 2017 is denoted by R, and translation vector 2018 is denoted by T, calculator 313 can convert three-dimensional point x in sensor coordinate system 2004 into three-dimensional point X in measurement coordinate system 2000 by Equation 1 shown below. Calculator 313 thus can calculate measurement coordinate system 2000.

$$X = Rx + T \qquad \text{Equation 1}$$

Next, coordinate system calculator 222A in the third example will be described with reference to FIG. 10 and FIG. 11.

Figure 10:
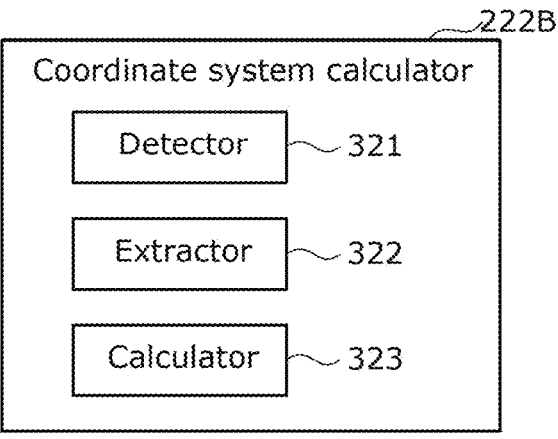
FIG. 10 is a block diagram illustrating a configuration of a coordinate system calculator in the third example.

FIG. 10 is a block diagram illustrating a configuration of the coordinate system calculator in the third example. FIG. 11 is a diagram for describing a method for calculating a measurement coordinate system by the coordinate system calculator in the third example.

Coordinate system calculator 222B includes detector 321, extractor 322, and calculator 323. In the third example, marker 104 is disposed at a specific position on rack 102 (e.g., a position on its top face), and coordinate system calculator 222B determines measurement coordinate system 2000 based on a position of marker 104. That is, measurement coordinate system 2000 in this case is a coordinate system based on the position of marker 104 placed on rack 102.

Marker 104 has, for example, a checkered pattern. Marker 104 is not limited to a checkered pattern as long as marker 104 is an alignment mark (registration mark) having a prescribed shape.

Figure 11:
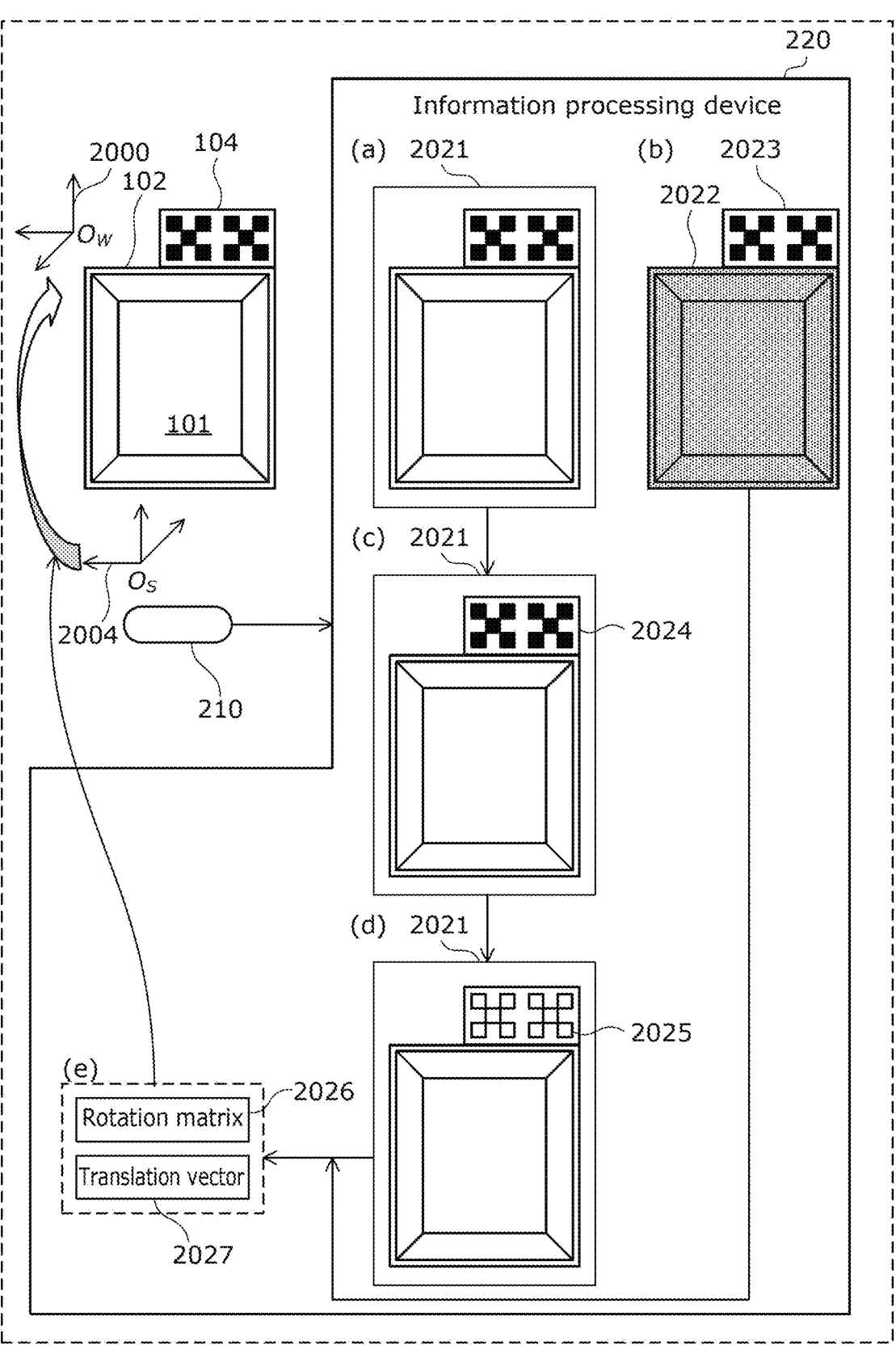
FIG. 11 is a diagram for describing a method for calculating a measurement coordinate system by the coordinate system calculator in the third example.

From image 2021 illustrated in (a) of FIG. 11, which is a result of measurement by range sensor 210 obtained by obtainer 221, detector 321 detects marker region 2024 corresponding to marker 104 placed on rack 102 as illustrated in (c) of FIG. 11.

From marker region 2024 in image 2021, extractor 322 extracts pattern contour 2025, which is a contour of the checkered pattern, as illustrated in (d) of FIG. 11.

Based on a shape of extracted pattern contour 2025, calculator 323 calculates rotation matrix 2026 and translation vector 2027 that indicate a positional relation between range sensor 210 and marker 104. Using rotation matrix 2026 and translation vector 2027, and a positional relation between storage three-dimensional model 2022 and marker 2023 illustrated in (b) of FIG. 11, calculator 323 calculates a three-dimensional positional relation between range sensor 210 and rack 102 and calculates measurement coordinate system 2000 by converting sensor coordinate system 2004 using the calculated three-dimensional positional relation. Thereby, calculator 323 can associate the position of the storage three-dimensional model with the position of the space three-dimensional model. It should be noted that the positional relation between storage three-dimensional model 2022 and marker 2023 may be measured in advance or may be generated in advance based on design information of rack 102 on which marker 104 is disposed.

Referring back to FIG. 2, model generator 223 will be described.

Model generator 223 generates a storage three-dimensional model, which is a three-dimensional model of rack 102 where no baggage 103 is stored. Model generator 223 obtains a result of measurement by range sensor 210 on rack 102 where no baggage 103 is stored, thus generating the storage three-dimensional model. A specific process by model generator 223 will be described later. The generated storage three-dimensional model is stored in storage 225.

Here, model generator 223 will be described specifically with reference to FIG. 12 and FIG. 13.

Figure 12:
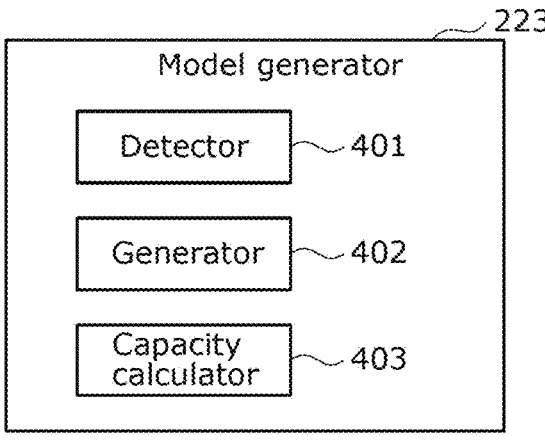
FIG. 12 is a block diagram illustrating an example of a configuration of a model generator.
Figure 13:
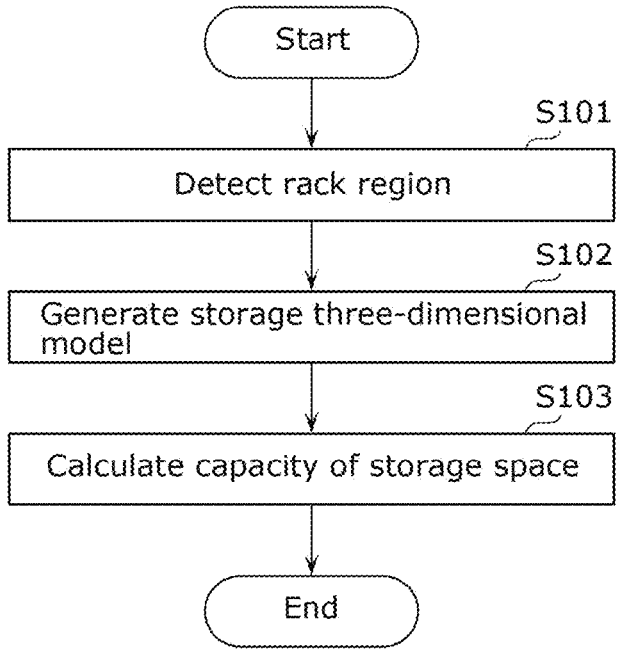
FIG. 13 is a flowchart of a process of calculating a capacity of a storage space by the model generator.

FIG. 12 is a block diagram illustrating an example of a configuration of the model generator. FIG. 13 is a flowchart of a process of calculating a capacity of a storage space by the model generator.

Model generator 223 includes detector 401, generator 402, and capacity calculator 403.

Detector 401 detects a rack region corresponding to rack 102 from a space three-dimensional model measured by range sensor 210 (S101). In a case where three-dimensional measurement system 200 includes range sensors 210, detector 401 performs the process of step S101 on each of range sensors 210. Detector 401 thus detects rack regions corresponding to range sensors 210.

In a case where three-dimensional measurement system 200 includes range sensors 210, generator 402 integrates the rack regions together, thus generating a storage three-dimensional model (S102). Specifically, generator 402 may perform alignment of a three-dimensional point cloud by Iterative Closest Point (ICP) to integrate the rack regions together or may calculate a relative positional relation among range sensors 210 in advance and integrate the rack regions together based on the calculated relative positional relation. The relative positional relation may be calculated by Structure from Motion (SfM) using images obtained by range sensors 210 as multi-viewpoint images. Range sensors 210 may be placed based on a design drawing in which the relative positional relation is determined.

The storage three-dimensional model of rack 102 may be generated by using results of measurement measured at positions to which one range sensor 210 is moved, rather than using range sensors 210, and by integrating rack regions obtained from the results of measurement.

Without using the results of measurement by range sensor 210, the storage three-dimensional model may be generated based on 3DCAD data at a time when rack 102 is designed or may be generated based on dimension measurement data of rack 102 or on equipment specification data of rack 102 published from its manufacturer. It should be noted that the storage three-dimensional model may be generated by inputting, to information processing device 220, the dimensions of rack 102 which are measured manually.

In a case where three-dimensional measurement system 200 does not include range sensors 210 but includes only one range sensor 210, and one result of measurement measured at one position is used, model generator 223 need not include generator 402. That is, model generator 223 need not perform step S102.

Capacity calculator 403 calculates a capacity of storage space 101 of rack 102 using the storage three-dimensional model (S103).

Referring back to FIG. 2, filling rate calculator 224 will be described.

Filling rate calculator 224 calculates a filling rate of baggage 103 with respect to storage space 101 of rack 102. For example, filling rate calculator 224 may calculate, as the filling rate, a proportion of a volume of baggage 103 to the capacity of storage space 101 using a space three-dimensional model obtained by range sensor 210, an image, and measurement coordinate system 2000.

Here, filling rate calculator 224 will be described specifically with reference to FIG. 14 and FIG. 15.

Figure 14:
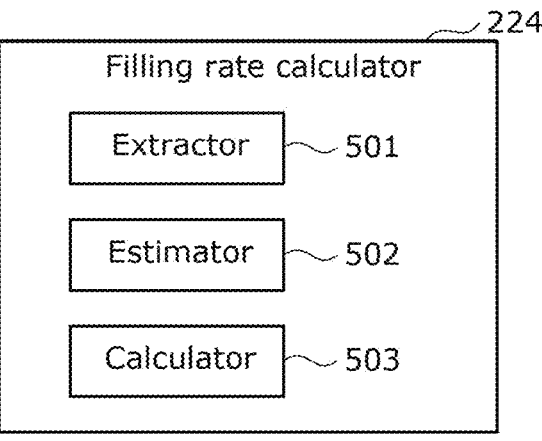
FIG. 14 is a block diagram illustrating an example of a configuration of a filling rate calculator.

FIG. 14 is a block diagram illustrating an example of a configuration of the filling rate calculator. FIG. 15 is a diagram for describing an example of a method for calculating the filling rate by the filling rate calculator. FIG. 15 illustrates an example of a case where range sensor 210 directly faces opening 102a of rack 102. Range sensor 210 is disposed on a Z-axis negative direction side on which opening 102a of rack 102 is formed, and range sensor 210 measures storage space 101 of rack 102 via opening 102a of rack 102. This example is an example of a case where measurement coordinate system 2000 is measured by coordinate system calculator 222 in the first example. That is, in this case, sensor coordinate system 2004 matches measurement coordinate system 2000.

Filling rate calculator 224 includes extractor 501, estimator 502, and calculator 503.

Using space three-dimensional model 2011 and a storage three-dimensional model, extractor 501 extracts baggage region 2033, which is a portion of the space three-dimensional model corresponding to baggage 103. Specifically, extractor 501 converts a data structure of space three-dimensional model 2011 illustrated in (a) of FIG. 15, which is a result of measurement by range sensor 210 obtained by obtainer 221, into voxel data, thus generating voxel data 2031 illustrated in (b) of FIG. 15. Using voxel data 2031 generated and storage three-dimensional model 2032 illustrated in (c) of FIG. 15, which is a storage three-dimensional model converted into voxels, extractor 501 subtracts storage three-dimensional model 2032 from voxel data 2031, thus extracting baggage region 2033 in voxel data 2031 illustrated in (d) of FIG. 15, which is a region resulting from measuring baggage 103. Baggage region 2033 is an example of a target portion, which is a portion corresponding to a measurement target.

Using baggage region 2033 extracted, estimator 502 estimates baggage model 2034, which is a three-dimensional model of baggage 103 in storage space 101. Baggage model 2034 is an example of the target three-dimensional model. Specifically, using baggage region 2033, estimator 502 interpolates baggage region 2033 toward a region in which baggage 103 is hidden with respect to range sensor 210 in a Z-axis direction, in which range sensor 210 and rack 102 are arranged, that is, toward a Z-axis positive direction side. For example, for each of voxels constituting baggage region 2033, estimator 502 determines whether the voxel is a voxel that is disposed on the Z-axis negative direction side of a farthest voxel, which is disposed farthest on the Z-axis positive direction side among the voxels. When the voxel is disposed on the Z-axis negative direction side of the farthest voxel, in a case where there are no voxels disposed on the Z-axis positive direction side of the voxel, estimator 502 interpolates voxels up to the same position as a position of the farthest voxel in the Z-axis direction. Estimator 502 thus estimates baggage model 2034 as illustrated in (e) of FIG. 15.

Using the storage three-dimensional model and baggage model 2034, calculator 503 calculates a first filling rate of baggage 103 with respect to storage space 101. Specifically, calculator 503 counts the number of voxels constituting baggage model 2034 and multiplies a predetermined voxel size by the counted number, thus calculating the volume of baggage 103. Calculator 503 calculates, as the first filling rate, a proportion of the calculated volume of baggage 103 with respect to the capacity of storage space 101 of rack 102 calculated by model generator 223.

Figure 16:
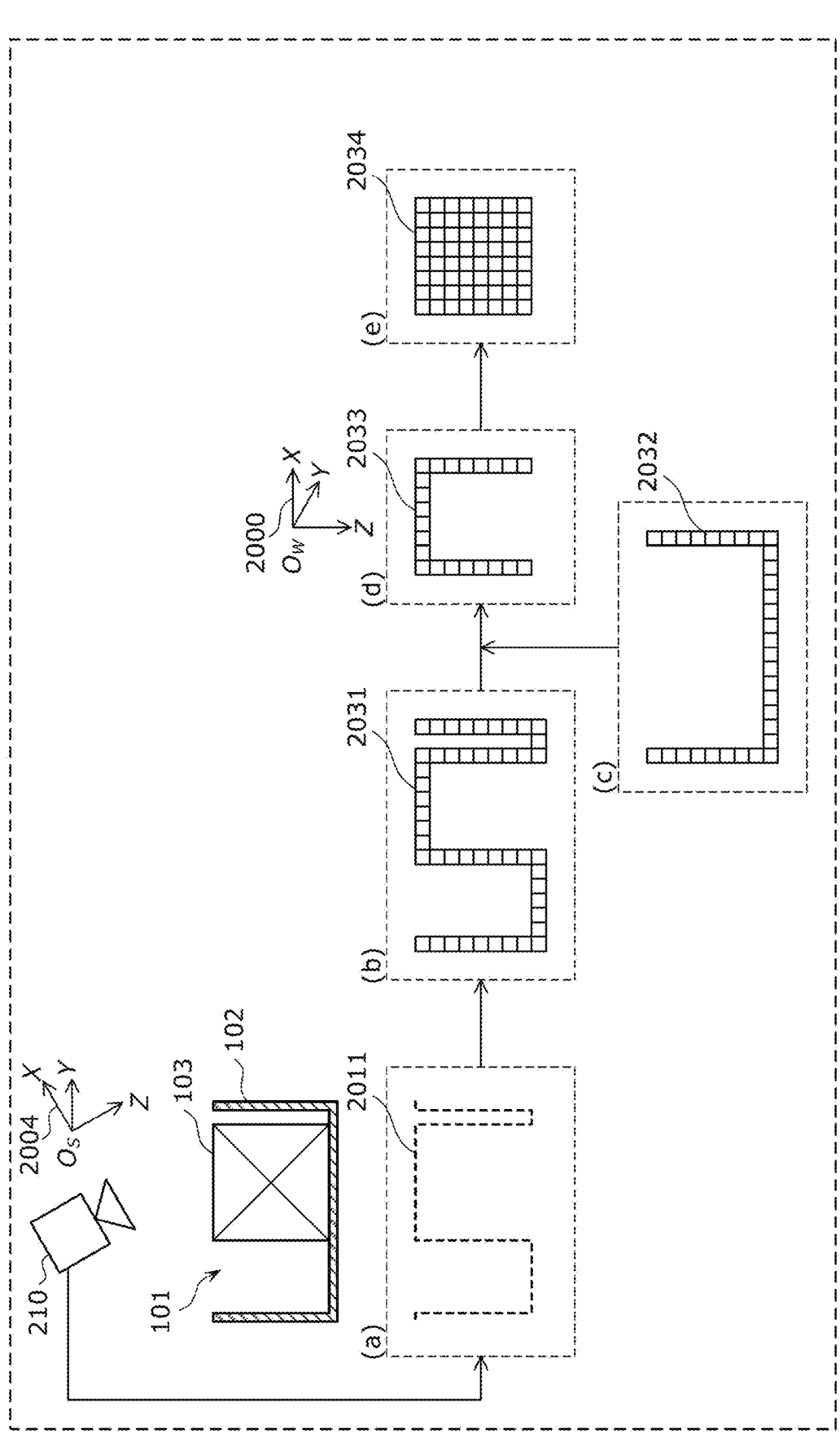
FIG. 16 is a diagram for describing another example of the method for calculating a filling rate by the filling rate calculator.

Range sensor 210 need not directly face opening 102a of rack 102. FIG. 16 is a diagram for describing another example of the method for calculating the filling rate by the filling rate calculator. FIG. 16 illustrates an example of a case where range sensor 210 is disposed inclined with respect to opening 102a of rack 102. This example is an example of a case where measurement coordinate system 2000 is measured by coordinate system calculator 222A in the second example or coordinate system calculator 222B in the third example. That is, in this case, sensor coordinate system 2004 differs from measurement coordinate system 2000.

A coordinate system used in the case in the example illustrated in FIG. 16 is measurement coordinate system 2000. Using baggage region 2033, estimator 502 interpolates baggage region 2033 toward a region in which baggage 103 is hidden with respect to range sensor 210 in a Z-axis direction of measurement coordinate system 2000, in which range sensor 210 and rack 102 are arranged, that is, toward the Z-axis positive direction side.

Figure 15:
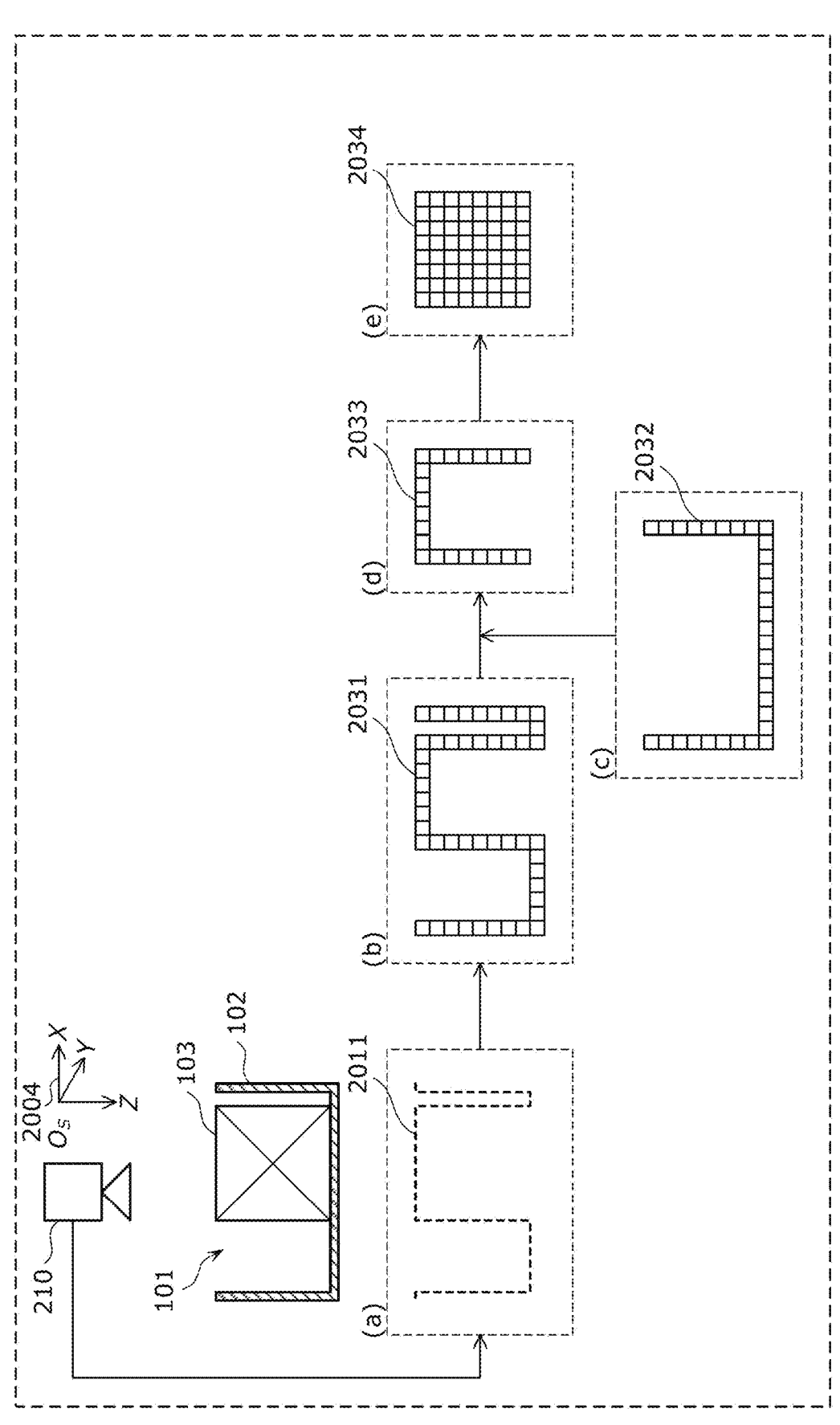
FIG. 15 is a diagram for describing an example of a method for calculating a filling rate by the filling rate calculator.

The rest of processing by filling rate calculator 224 is the same as in the case illustrated in FIG. 15, and thus description thereof will be omitted.

It should be noted that a combination of the space three-dimensional model and the image used for the calculation of the measurement coordinate system by coordinate system calculator 222 and the calculation of the filling rate by filling rate calculator 224 may be results of measurement performed by range sensor 210 at the same time or may be results of measurement performed at different times.

Range sensor 210 and information processing device 220 may be connected to each other via a communication network so as to be communicated with each other. The communication network may be a public telecommunication network such as the Internet or a private telecommunication network. Thus, the space three-dimensional model and the image obtained by range sensor 210 are transmitted from range sensor 210 to information processing device 220 via the communication network.

Information processing device 220 may obtain the space three-dimensional model and the image from range sensor 210 not via the communication network. For example, the space three-dimensional model and the image may be stored once from range sensor 210 in an external storage device such as a hard disk drive (HDD) and a solid state drive (SSD), and information processing device 220 may obtain the space three-dimensional model and the image from the external storage device. Alternatively, the external storage device may be a cloud server.

For example, information processing device 220 includes at least a computer system that includes a control program, a processing circuit that executes the control program, such as a processor and a logic circuit, and a recording device that stores the control program such as an internal memory or an accessible external memory. Functions by processing units of information processing device 220 may be implemented in a form of software or may be implemented in a form of hardware.

Next, operation of information processing device 220 will be described.

Figure 17:
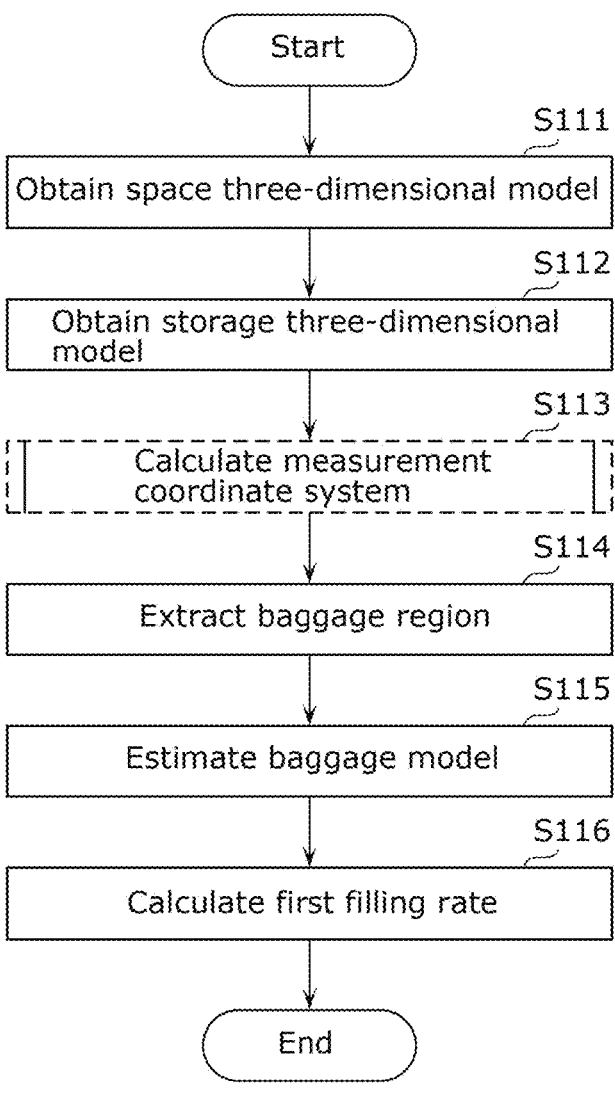
FIG. 17 is a flowchart of a filling rate measurement method performed by an information processing device.

FIG. 17 is a flowchart of a filling rate measurement method performed by the information processing device.

Information processing device 220 obtains a space three-dimensional model from range sensor 210 (S111). At this time, information processing device 220 may further obtain an image of a measurement target from range sensor 210.

Information processing device 220 obtains a storage three-dimensional model stored in storage 225 (S112).

Information processing device 220 calculates a measurement coordinate system based on a shape of opening 102a of rack 102 (S113). Step S113 is a process by coordinate system calculator 222.

Using voxel data 2031 of space three-dimensional model 2011 and storage three-dimensional model 2032 of the storage three-dimensional model, information processing device 220 extracts baggage region 2033 that corresponds to baggage 103 in voxel data 2031 (S114). Step S114 is a process by extractor 501 of filling rate calculator 224.

Using baggage region 2033 extracted, information processing device 220 estimates baggage model 2034, which is a three-dimensional model of baggage 103 in storage space 101 (S115). Step S115 is a process by estimator 502 of filling rate calculator 224.

Using the storage three-dimensional model and baggage model 2034, information processing device 220 calculates a first filling rate of baggage 103 with respect to storage space 101 (S116). Step S116 is a process by calculator 503 of filling rate calculator 224.

Figure 18:
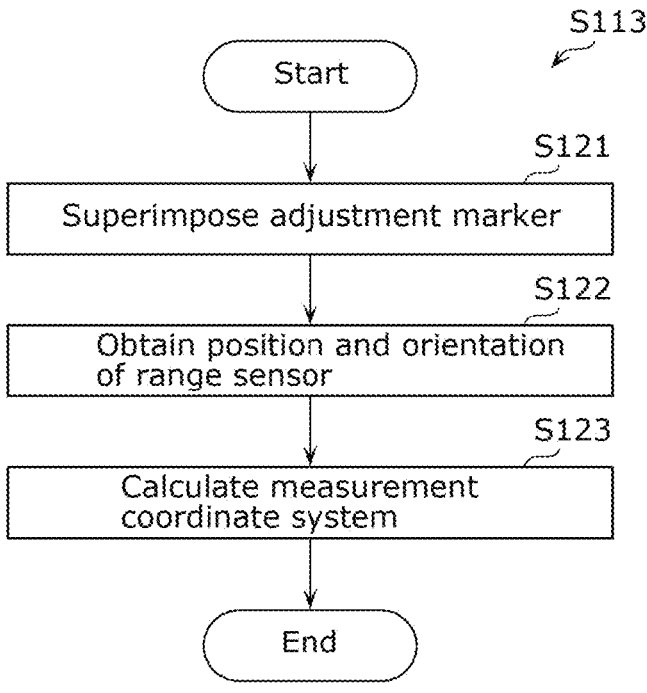
FIG. 18 is a flowchart of a process (S113) of calculating a measurement coordinate system by the coordinate system calculator in the first example.

FIG. 18 is a flowchart of the process of calculating the measurement coordinate system by the coordinate system calculator in the first example (S113).

Coordinate system calculator 222 successively obtains images 2001, which are results of measurement by range sensor 210 obtained by obtainer 221, in real time, and successively superimposes adjustment markers 2002 on images 2001 successively obtained (S121). Step S121 is a process by assister 301 of coordinate system calculator 222.

Coordinate system calculator 222 obtains a position and orientation of range sensor 210 (S122). Step S122 is a process by assister 301 of coordinate system calculator 222.

Using the position and the orientation of range sensor 210 at a time when four adjustment markers 2002 are aligned with positions of four corners of opening 102a, coordinate system calculator 222 determines sensor coordinate system 2004 of range sensor 210 and calculates measurement coordinate system 2000 using determined sensor coordinate system 2004 (S123). Step S123 is a process by calculator 302 of coordinate system calculator 222.

Figure 19:
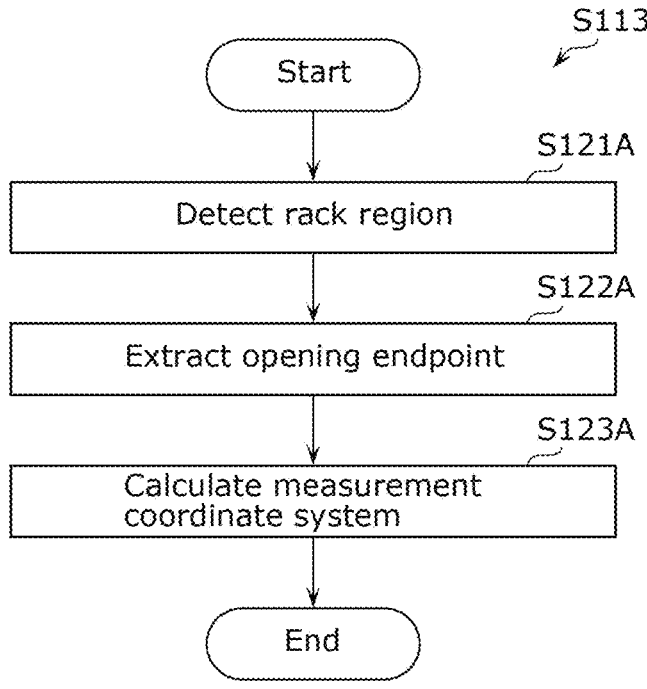
FIG. 19 is a flowchart of a process (S113) of calculating a measurement coordinate system by the coordinate system calculator in the second example.

FIG. 19 is a flowchart of the process of calculating the measurement coordinate system by the coordinate system calculator in the second example (S113).

Using space three-dimensional model 2011, which is a result of measurement by range sensor 210 obtained by obtainer 221, and storage three-dimensional model 2012, coordinate system calculator 222A detects rack region 2014 corresponding to rack 102 (S121A). Step S121A is a process by detector 311 of coordinate system calculator 222A.

Using position information 2013 in storage three-dimensional model 2012, coordinate system calculator 222A extracts four opening endpoints 2016, which are positions of four corners of opening 2015 in rack region 2014 (S122A). Step S122A is a process by extractor 312 of coordinate system calculator 222A.

Coordinate system calculator 222A calculates rotation matrix 2017 and translation vector 2018 that indicate a positional relation between range sensor 210 and rack 102 based on a shape of four opening endpoints 2016 as viewed from range sensor 210. Coordinate system calculator 222A then converts sensor coordinate system 2004 of range sensor 210 using rotation matrix 2017 and translation vector 2018, thus calculating measurement coordinate system 2000 (S123A). Step S123A is a process by calculator 313 of coordinate system calculator 222A.

Figure 20:
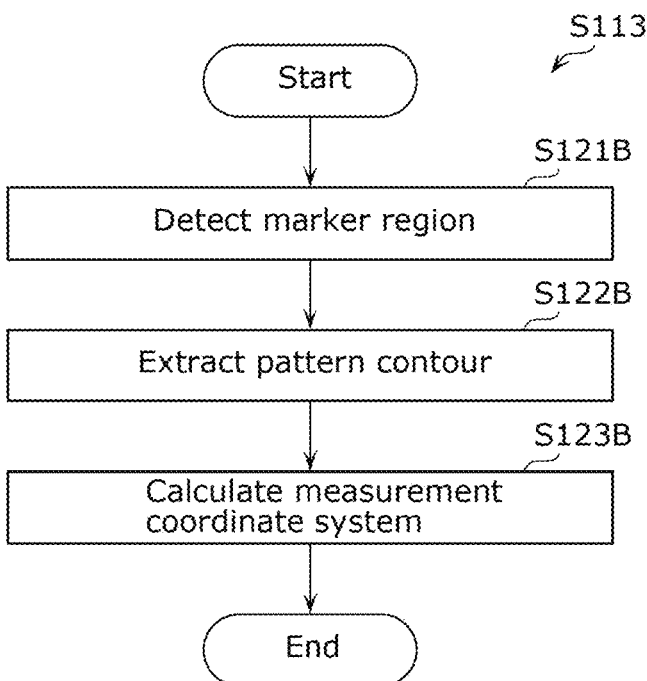
FIG. 20 is a flowchart of a process (S113) of calculating a measurement coordinate system by the coordinate system calculator in the third example.

FIG. 20 is a flowchart of the process of calculating the measurement coordinate system by the coordinate system calculator in the third example (S113).

Coordinate system calculator 222B detects marker region 2024 from image 2021, which is a result of measurement by range sensor 210 obtained by obtainer 221 (S121B). Step S121B is a process by detector 321 of coordinate system calculator 222B.

From marker region 2024 in image 2021, coordinate system calculator 222B extracts pattern contour 2025 (S122B). Step S122B is a process by extractor 322 of coordinate system calculator 222B.

Based on a shape of extracted pattern contour 2025, coordinate system calculator 222B calculates rotation matrix 2026 and translation vector 2027 that indicate a positional relation between range sensor 210 and marker 104. Using rotation matrix 2026 and translation vector 2027, and a positional relation between storage three-dimensional model 2022 and marker 2023, coordinate system calculator 222B then calculates a three-dimensional positional relation between range sensor 210 and rack 102 and calculates measurement coordinate system 2000 by converting sensor coordinate system 2004 using the calculated three-dimensional positional relation (S123B). Step S123B is a process by calculator 323 of coordinate system calculator 222B.

The filling rate calculated by information processing device 220 may be output from information processing device 220. The filling rate may be displayed by a display device not illustrated included in information processing device 220 or may be transmitted to an external device different from information processing device 220. For example, the calculated filling rate may be output to a baggage conveyance system and used for controlling the baggage conveyance system.

In the filling rate measurement method according to the present embodiment, baggage model 2034 of baggage 103 is estimated using baggage region 2033 that is extracted using the space three-dimensional model made by measuring rack 102 in a state where baggage 103 is stored and the storage three-dimensional model of rack 102 where no baggage 103 is stored. This enables the first filling rate of baggage 103 with respect to storage space 101 to be calculated easily only by measuring rack 102 in a state where baggage 103 is stored.

In addition, in the filling rate measurement method, baggage model 2034 is estimated based on a three-dimensional coordinate system based on a shape of a part of rack 102. Therefore, a processing amount of estimation of baggage model 2034 can be reduced.

In addition, in the filling rate measurement method, baggage model 2034 is estimated based on a three-dimensional coordinate system based only on a shape of a part of rack 102. A shape of only a part of the storage, which is easy to extract on an image, can be used for calculation of a measurement coordinate system. Therefore, a processing speed of the estimation of the baggage model can be improved, and a precision of calculating the measurement coordinate system can be improved.

Further, in the filling rate measurement method, the three-dimensional coordinate system is a three-dimensional orthogonal coordinate system having the Z axis, and baggage model 2034 is estimated by interpolating the Z-axis positive direction side, which is opposite to a Z-axis negative direction of baggage region 2033. This enables an effective reduction in processing amount of the estimation of baggage model 2034.

Further, in the filling rate measurement method, the three-dimensional coordinate system is a coordinate system based on the shape of opening 102a of rack 102. Therefore, the coordinate system based on the shape of opening 102a of rack 102 can be calculated easily, and baggage model 2034 can be estimated based on the calculated coordinate system.

Further, in the filling rate measurement method, the three-dimensional coordinate system may be a coordinate system based on marker 104 placed on rack 102. Therefore, the coordinate system based on marker 104 can be calculated easily, and baggage model 2034 can be estimated based on the calculated coordinate system.

Embodiment 2

Compared with the information processing device according to Embodiment 1, an information processing device according to Embodiment 2 differs in a configuration of the coordinate system calculator. This will be described below specifically.

Figure 21:
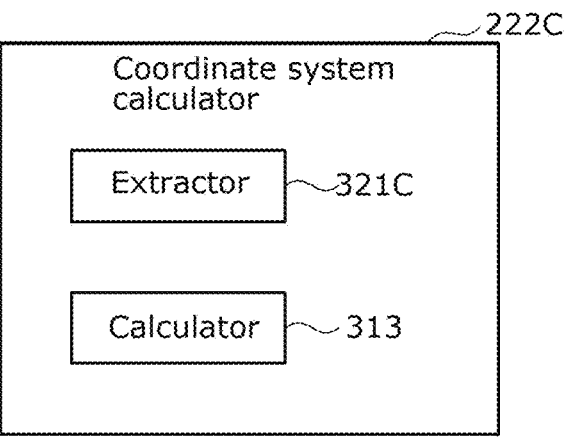
FIG. 21 is a block diagram illustrating a configuration of the coordinate system calculator according to Embodiment 2.
Figure 22:
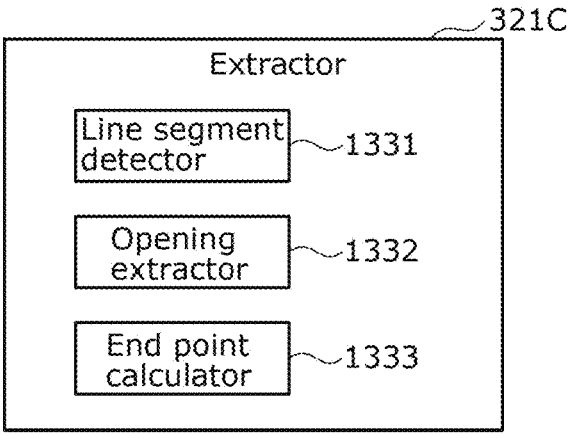
FIG. 22 is a block diagram illustrating a configuration of a detector included in the coordinate system calculator according to Embodiment 2.
Figure 23:
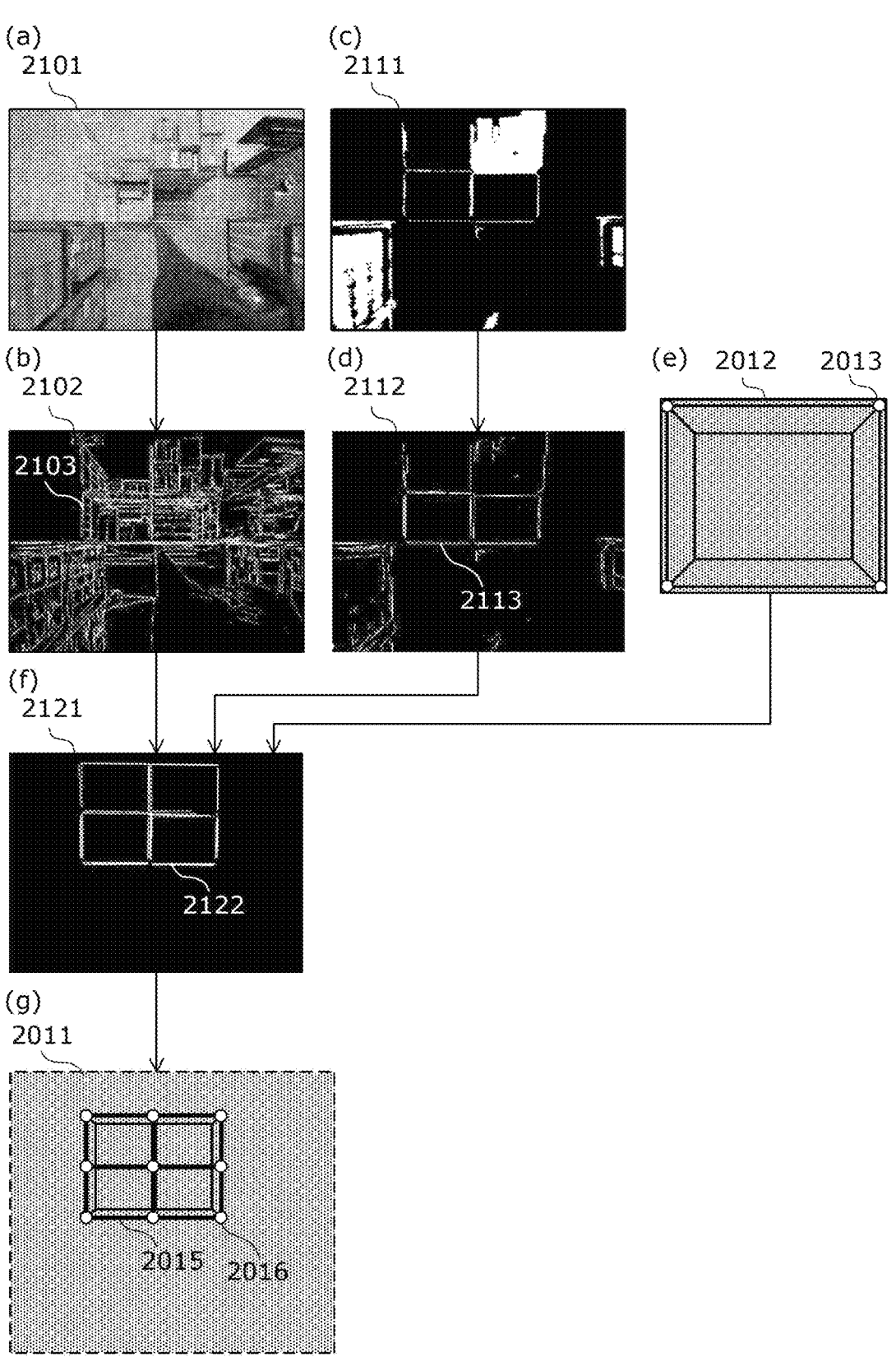
FIG. 23 is a diagram for describing a method of extracting opening endpoints by a detector according to Embodiment 2.

FIG. 21 is a block diagram illustrating the configuration of the coordinate system calculator according to Embodiment 2. FIG. 22 is a block diagram illustrating a configuration of an extractor included in the coordinate system calculator according to Embodiment 2. FIG. 23 is a diagram for describing a method of extracting opening endpoints by the detector according to Embodiment 2.

Coordinate system calculator 222C differs in that coordinate system calculator 222C includes extractor 321C in place of detector 311 and extractor 312 included in coordinate system calculator 222A.

As with detector 311 and extractor 312, extractor 321C extracts four opening endpoints 2016, which are positions of four corners of one or more openings 2015 in rack region 2014, using storage three-dimensional model 2012 and a result of measuring performed by range sensor 210 obtained by obtainer 221. It should be noted that extractor 321C is only required to determine four opening endpoints 2016 of one or more openings 2015 in rack region 2014 and need not perform a process of extracting four opening endpoints 2016. Extractor 321C includes line segment detector 1331, opening extractor 1332, and end point calculator 1333.

The result of measuring performed by range sensor 210 in Embodiment 2 includes an RGB image and a depth image. The RGB image is a two-dimensional image that is captured by a camera built in range sensor 210. The RGB image is an image in which the entire opening 2015 is seen. That is, the RGB image is a two-dimensional image of opening 2015. As such, the RGB image is an example of a two-dimensional image of opening 2015 that is generated by measurement in a specific direction from the position of range sensor 210. The RGB image is an image that is obtained by imaging (measurement) with the camera that is disposed at the position of range sensor 210 facing in the specific direction. The specific direction is a direction that indicates an orientation of the camera at the time when the RGB image is captured (e.g., an imaging direction). For example, the specific direction is a direction from the position of range sensor 210 toward opening 2015. It should be noted that the specific direction need not match the direction from the position of range sensor 210 toward opening 2015. The specific direction is only required to be the imaging direction of the camera at the time when a range of the capturing by the camera includes opening 2015. The position of range sensor 210 and the specific direction may be used as the position and the orientation of the camera (external parameters of the camera), respectively. The position and the orientation of the camera may be set in advance. The external parameters of the camera provide position orientation information that corresponds to the RGB image.

The depth image is an image that is generated by range sensor 210. The depth image is a two-dimensional image containing, as pixel values, distances to a measurement target including opening 2015 in a measuring direction (depth direction) that are measured by range sensor 210. That is, the depth image is another example of a two-dimensional image of opening 2015. The depth image is, for example, an image that is generated based on a result of measuring performed by range sensor 210. The depth image may be generated from a measurement result of only a region including opening 2015 and the vicinity of opening 2015 or may be generated from a space three-dimensional model or from a result of measurement based on which the space three-dimensional model is generated. In this case, remeasurement of opening 2015 by range sensor 210 is omitted. The specific direction is a direction that indicates an orientation of range sensor 210 at the time when the result of measuring performed by range sensor 210 based on which the depth image is generated is measured (e.g., the measuring direction). For example, the specific direction is a direction from the position of range sensor 210 toward opening 2015. It should be noted that the specific direction need not match the direction from the position of range sensor 210 toward opening 2015. The specific direction is only required to be a direction in which range sensor 210 performs measurement at the time when a measurement range of range sensor 210 includes opening 2015. The position of range sensor 210 and the specific direction indicate the position and the orientation of range sensor 210, respectively, and are external parameters of range sensor 210. The external parameters of range sensor 210 provide position orientation information that corresponds to the depth image.

It should be noted that the two-dimensional image is not limited to an RGB image and a depth image. A grayscale image, an infrared image, or the like may be used.

The specific direction of the camera and the specific direction of range sensor 210 may be the same or may be different from each other. The external parameters of the camera may be the same as the external parameters of range sensor 210. For this reason, the external parameters of range sensor 210 may be used as the external parameters of the camera.

Line segment detector 1331 performs a process of detecting line segments on RGB image 2101 illustrated in (a) in FIG. 23. Line segment detector 1331 detects line segments from RGB image 2101, thereby generating line segment image 2102 including line segments 2103 in RGB image 2101, as illustrated in (b) in FIG. 23.

Likewise, line segment detector 1331 performs the process of detecting line segments on depth image 2111 illustrated in (c) in FIG. 23. Line segment detector 1331 detects line segments from depth image 2111, thereby generating line segment image 2112 including line segments 2113 in depth image 2111, as illustrated in (d) in FIG. 23.

In the process of detecting line segments, line segment detector 1331 detects the line segments by detecting edges based on differences in pixel value between adjacent pixels in each image and detecting directions that are perpendicular to directions of the detected edges.

Using line segment images 2102, 2112, and storage three-dimensional model 2012 illustrated in (e) in FIG. 23, opening extractor 1332 extracts, from line segment images 2102 and 2112, line segments 2122 that indicate shapes of openings 2015 and generates line segment image 2121 that includes line segments 2122, as illustrated in (f) in FIG. 23. Specifically, opening extractor 1332 extracts line segments 2122 by performing pattern matching on a line segment image obtained by combining line segment images 2102 and 2112, using a shape of an opening of storage three-dimensional model 2012 as a template. Line segment image 2102 and line segment image 2112 may be combined by placing a plurality of line segments included in one of line segment images 2102 and 2112 at positions of the plurality of line segments in the other after alignment of line segment image 2102 and line segment image 2112 is performed using the external parameters of the camera and the external parameters of range sensor 210. Line segment image 2121 may be an image that includes only line segments 2122 indicating the shapes of openings 2015. In line segment image 2121 in (f) in FIG. 23, line segments 2122 including shapes of four openings 2015 are extracted because line segment images 2102 and 2112 are each determined to have four shapes each of which matches storage three-dimensional model 2012.

End point calculator 1333 extracts, as illustrated in (g) in FIG. 23, four opening endpoints 2016, which are positions of four corners of each opening 2015 in rack region 2014, based on the external parameters of the camera, the external parameters of range sensor 210, and line segments 2122 included in line segment image 2121. The external parameters of the camera and the external parameters of range sensor 210 may be stored in advance in storage 225 of information processing device 220. In the example illustrated in FIG. 23, the shapes of 4 openings 2015 are detected, and thus 16 opening endpoints 2016 are extracted. In (g) in FIG. 23, nine opening endpoints 2016 are illustrated because some of opening endpoints 2016 coincide.

When line segments 2122 including the shapes of openings 2015 are extracted by opening extractor 1332, the positions of openings 2015 can be identified. Therefore, processing by end point calculator 1333 need not necessarily be performed. A shape of opening 2015 may be defined from line segments 2122, may be defined from opening endpoints 2016, or may be defined from a combination of line segments 2122 and opening endpoints 2016. In a case where the shape of opening 2015 is a quadrilateral, the shapes may be defined from four line segments, may be defined from opening endpoints indicating four vertices, or may be defined from a combination of the line segments and the opening endpoints. That is, in a case where the shape of the opening is a polygon, the shape may be defined from line segments forming sides of the polygon, may be defined from vertices of the polygon, or may be defined from a combination of the line segments and the vertices. In a case where the shape of the opening is a circle that includes an ellipse and a perfect circle, the shape may be defined from a shape of a curve of an outer edge of the circle.

As seen from the above, extractor 321C identifies line segments indicating the shape of opening 2015 from RGB image 2101 and depth image 2111. Extractor 321C then calculates the positions of opening 2015 in a three-dimensional space based on the position of range sensor 210, the specific direction, and the determined shape of opening 2015 (i.e., line segments 2122 in line segment image 2121).

Processing by calculator 313 after the four opening endpoints 2016 are extracted is the same as that in Embodiment 1, and thus description of the processing will be omitted.

An example of extracting the line segments of openings 2015 based on both RGB image 2101 and depth image 2111 as two-dimensional images is described with reference to FIG. 23. However, this is not limitative. For example, the line segments of openings 2015 may be extracted based on one of RGB image 2101 and depth image 2111.

An accuracy of extracting line segments from RGB image 2101 is influenced by an environment such as, for example, brightness (illuminance) of the vicinity of openings 2015. RGB image 2101 has a large amount of information compared with depth image 2111. Therefore, many line segments are detected from RGB image 2101.

In contrast, an accuracy of extracting line segments from depth image 2111 is less likely to be influenced by the environment (brightness) than RGB image 2101. In a case where distance information is not obtained by measurement, depth image 2111 may have omissions in a region where the distance information is not obtained. As seen from the above, RGB image 2101 and depth image 2111 are different from each other in characteristics. Therefore, a process of extracting line segments of openings 2015 may be performed based on the characteristics of each image.

For example, in the process of extracting line segments, when the brightness of the vicinity of openings 2015 exceeds a prescribed illuminance, the line segments of openings 2015 may be extracted from a result of combining line segment image 2102 obtained from RGB image 2101 and line segment image 2112 obtained from depth image 2111 in such a manner that RGB image 2101 is given priority over depth image 2111, so that an accuracy of extracting line segments is improved. Conversely, in the process of extracting line segments, when the brightness of the vicinity of openings 2015 is not more than a prescribed illuminance, line segment image 2102 obtained from RGB image 2101 and line segment image 2112 obtained from depth image 2111 may be combined in such a manner that depth image 2111 is given priority over RGB image 2101, so that an accuracy of extracting line segments of openings 2015 is improved.

The brightness of the vicinity of openings 2015 may be estimated from pixel values of pixels included in RGB image 2101.

The brightness of the vicinity of openings 2015 may decrease with an increase in a filling rate of baggage 103 with respect to storage space 101 of rack 102. In this case, the filling rate may be calculated once, and a two-dimensional image to be given priority in the process of extracting line segments may be determined based on the calculated filling rate. That is, in the process of extracting line segments, when the filling rate once calculated is not more than a prescribed filling rate, the line segments of openings 2015 may be extracted from a result of combining line segment image 2102 obtained from RGB image 2101 and line segment image 2112 obtained from depth image 2111 in such a manner that RGB image 2101 is given priority over depth image 2111, so that the accuracy of extracting line segments is improved. Conversely, in the process of extracting line segments, when the filling rate once calculated exceeds the prescribed filling rate, line segment image 2102 obtained from RGB image 2101 and line segment image 2112 obtained from depth image 2111 may be combined in such a manner that depth image 2111 is given priority over RGB image 2101, so that the accuracy of extracting line segments of openings 2015 is improved.

In the process of extracting line segments, when the number of omissions in the space three-dimensional model is larger than a prescribed threshold value, it is difficult to measure the shapes of openings from depth image 2111. Therefore, the line segments of openings 2015 may be extracted from a result of combining line segment image 2102 obtained from RGB image 2101 and line segment image 2112 obtained from depth image 2111 in such a manner that RGB image 2101 is given priority over depth image 2111, so that the accuracy of extracting line segments is improved. For example, distance information on openings 2015 at a position that is farther from range sensor 210 than a prescribed distance in a direction perpendicular to the measuring direction of range sensor 210 gives insufficient accuracy or includes omissions because the position makes it difficult for laser light beams from range sensor 210 to be reflected. For this reason, line segment image 2102 obtained from RGB image 2101 and line segment image 2112 obtained from depth image 2111 may be combined in such a manner that RGB image 2101 is given priority over depth image 2111. Conversely, in the process of extracting line segments, when the number of omissions in the space three-dimensional model is not more than the prescribed threshold value, line segment image 2102 obtained from RGB image 2101 and line segment image 2112 obtained from depth image 2111 may be combined in such a manner that depth image 2111 is given priority over RGB image 2101, so that the accuracy of extracting line segments of openings 2015 is improved.

The description above is given such that the line segments of openings 2015 are extracted from a result of combining line segment image 2102 obtained from RGB image 2101 and line segment image 2112 obtained from depth image 2111 in such a manner that RGB image 2101 is given priority over depth image 2111. Specifically, the following process may be performed.

A first example of this processing will be described. In a case where RGB image 2101 is given priority over depth image 2111, a result of the combination may include only line segment image 2102. In this case, line segment image 2112 need not be generated from depth image 2111.

Next, a second example of this processing will be described. In the process of extracting line segments in the second example, each extracted line segment may be given an evaluation value that indicates a likelihood (accuracy). That is, in this case, each of the line segments included in line segment images 2102 and 2112 is given an evaluation value. In a combination of line segment image 2102 and line segment image 2112, the evaluation value of each line segment in line segment images 2102 and 2112 is subjected to weighted sum with weights based on the illuminance of the vicinity of openings 2015. This integrates line segment image 2102 and line segment image 2112. In a case where RGB image 2101 is given priority over depth image 2111, the weights in the weighted sum are set such that weights for line segment image 2102 are greater than weights for line segment image 2112.

Out of the line segments in the integrated image, line segments each having an evaluation value greater than a threshold value are extracted as possible line segments of openings 2015, and pattern matching is performed on the extracted possible line segments to extract the line segments of openings 2015. The evaluation value indicating a likelihood may be a value that takes a higher value for a longer line segment or may be a value that takes a higher value for a larger difference in pixel value between two pixels adjacent across an edge used for detecting a line segment or a larger difference in pixel value between two pixels belonging to two respective regions adjacent across the edge.

Description of a case where line segment image 2102 obtained from RGB image 2101 and line segment image 2112 obtained from depth image 2111 are combined in such a manner that depth image 2111 is given priority over RGB image 2101 can be given by interchanging RGB image 2101 and depth image 2111 and interchanging line segment image 2102 and line segment image 2112 in the description of giving priority to RGB image 2101 over depth image 2111.

Next, operation of the information processing device according to Embodiment 2 will be described. Compared with the information processing device according to Embodiment 1, the information processing device according to Embodiment 2 differs in the configuration of the coordinate system calculator. Therefore, operation (S113) of the coordinate system calculator will be described.

Figure 24:
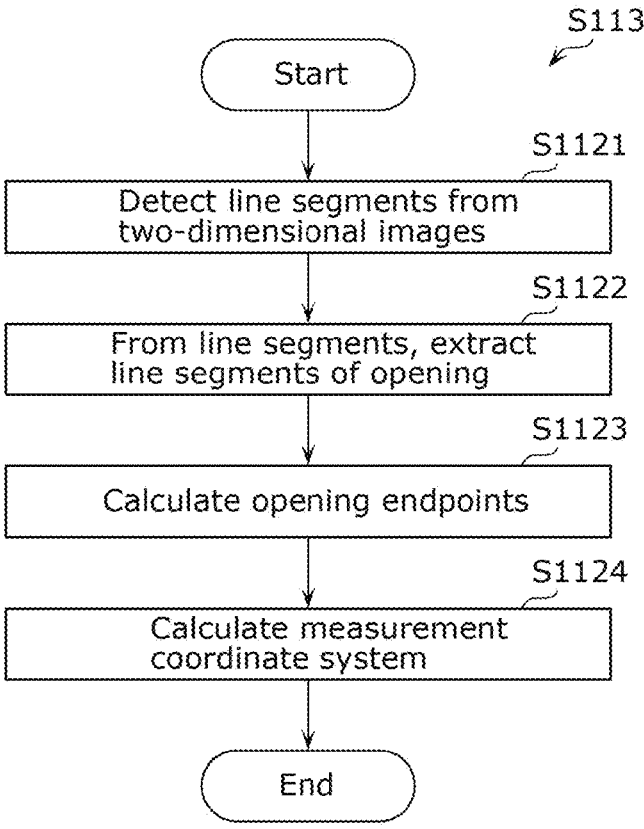
FIG. 24 is a flowchart of a process of calculating a measurement coordinate system by a coordinate system calculator in Embodiment 2 (S113).

FIG. 24 is a flowchart of a process of calculating a measurement coordinate system by the coordinate system calculator in Embodiment 2 (S113).

Coordinate system calculator 222C detects line segments from two-dimensional images (S1121). Specifically, coordinate system calculator 222C detects line segments from RGB image 2101, thereby generating line segment image 2102 including line segments 2103 in RGB image 2101. Coordinate system calculator 222C detects line segments from depth image 2111, thereby generating line segment image 2112 including line segments 2113 in depth image 2111. Step S1121 is a process by line segment detector 1331 of extractor 321C of coordinate system calculator 222C.

From the detected line segments, coordinate system calculator 222C extracts line segments of openings 2015 (S1122). Specifically, using line segment images 2102, 2112, and storage three-dimensional model 2012, coordinate system calculator 222C extracts, from line segment images 2102 and 2112, line segments 2122 that indicate shapes of openings 2015 and generates line segment image 2121 that includes line segments 2122. Step S1122 is a process by opening extractor 1332 of extractor 321C of coordinate system calculator 222C.

Coordinate system calculator 222C extracts four opening endpoints 2016, which are positions of four corners of each opening 2015 in rack region 2014, based on the position of range sensor 210, the direction in which RGB image 2101 and depth image 2111 are measured (i.e., the specific direction), and line segments 2122 included in line segment image 2121 (S1123). Step S1123 is a process by end point calculator 1333 of extractor 321C of coordinate system calculator 222C.

Coordinate system calculator 222C calculates rotation matrix 2017 and translational vector 2018 that indicate a positional relation between range sensor 210 and rack 102 based on a shape of four opening endpoints 2016 as viewed from range sensor 210. Coordinate system calculator 222C then converts sensor coordinate system 2004 of range sensor 210 using rotation matrix 2017 and translational vector 2018, thus calculating measurement coordinate system 2000 (S1124). Step S1124 is a process by calculator 313 of coordinate system calculator 222C. That is, this process is the same as the process by calculator 313 of coordinate system calculator 222A. This enables coordinate system calculator 222C to associate a position of the storage three-dimensional model with a position of the space three-dimensional model.

The process of step S1123 need not necessarily be performed. In a case where the process of step S1123 is not performed, in step S1124, coordinate system calculator 222C calculates rotation matrix 2017 and translational vector 2018 that indicate the positional relation between range sensor 210 and rack 102 based on line segments 2122 indicating the shapes of openings 2015. Coordinate system calculator 222C then converts sensor coordinate system 2004 of range sensor 210 using rotation matrix 2017 and translational vector 2018, thus calculating measurement coordinate system 2000.

Variation 1

Information processing device 220 according to the embodiments described above is configured to calculate the proportion of the volume of baggage 103 stored in storage space 101 with respect to the capacity of storage space 101 as the filling rate, but the configuration is not limited to this.

Figure 25:
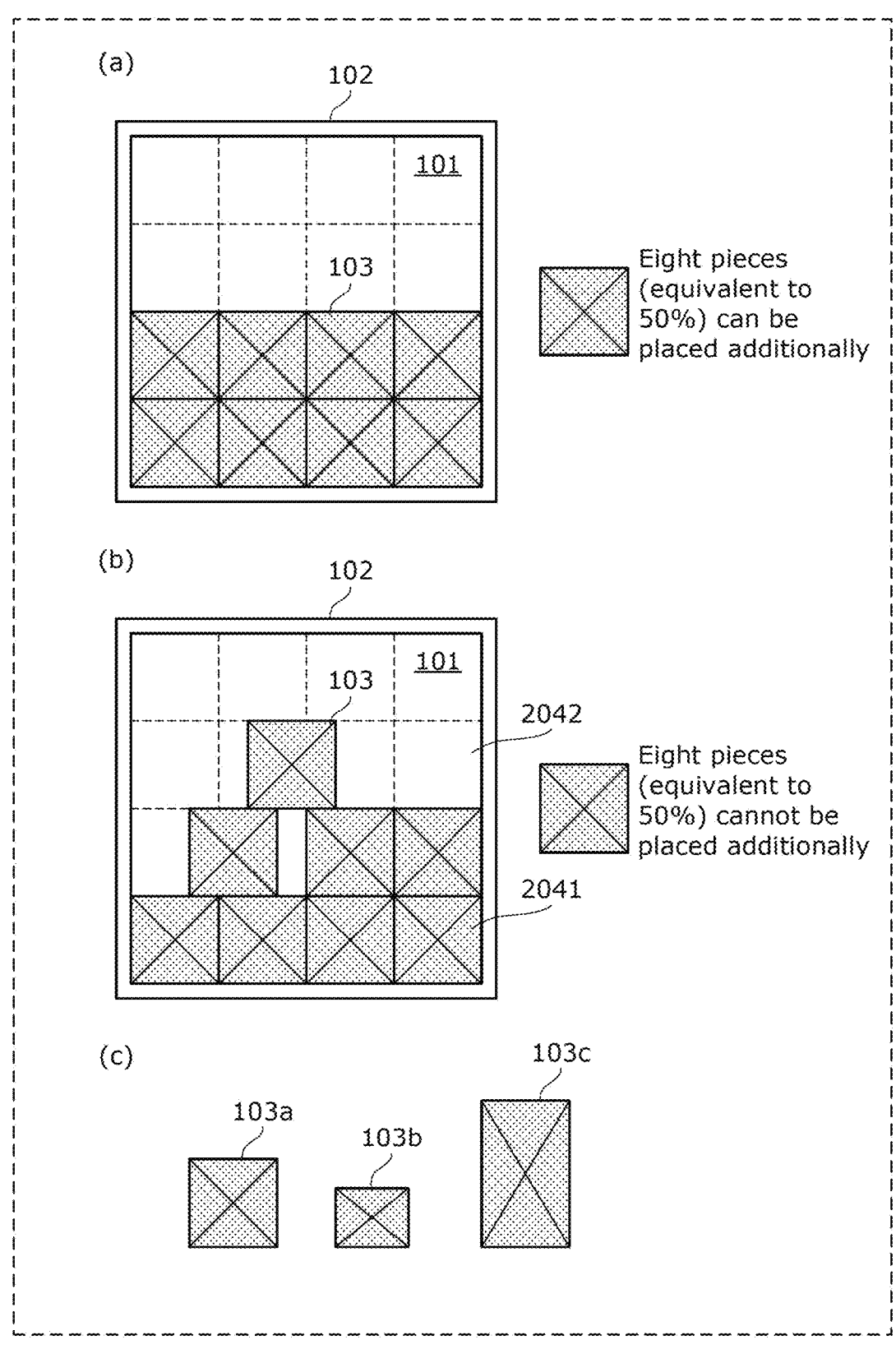
FIG. 25 is a diagram for describing a method for calculating a filling rate.

FIG. 25 is a diagram for describing a method for calculating a filling rate.

In (a) and (b) of FIG. 25, storage space 101 of rack 102 has a capacity that is capable of storing just 16 pieces of baggage 103. As illustrated (a) of FIG. 25, when eight pieces of baggage 103 are closely disposed, a vacancy of storage space 101 can store additional eight pieces of baggage 103. In contrast, as illustrated (b) of FIG. 25, when the pieces of baggage are disposed not closely, it is necessary to move the pieces of baggage 103 already stored so as to store additional eight pieces of baggage 103 in the rest of the space of storage space 101. If pieces of baggage 103 are stored in the rest of the space of storage space 101 without moving the pieces of baggage 103 already stored, only six pieces of baggage 103 can be stored.

As seen from the above, although the numbers of pieces of baggage 103 storable in the rest of the space of storage space 101 are different between the case illustrated in (a) of FIG. 25 and the case illustrated in (b) of FIG. 25, filling rates of both cases are calculated as the same filling rate, 50%. It is therefore conceivable to calculate a filling rate with consideration given to a space in which baggage can be practically stored, according to a shape of the rest of the space of storage space 101.

Figure 26:
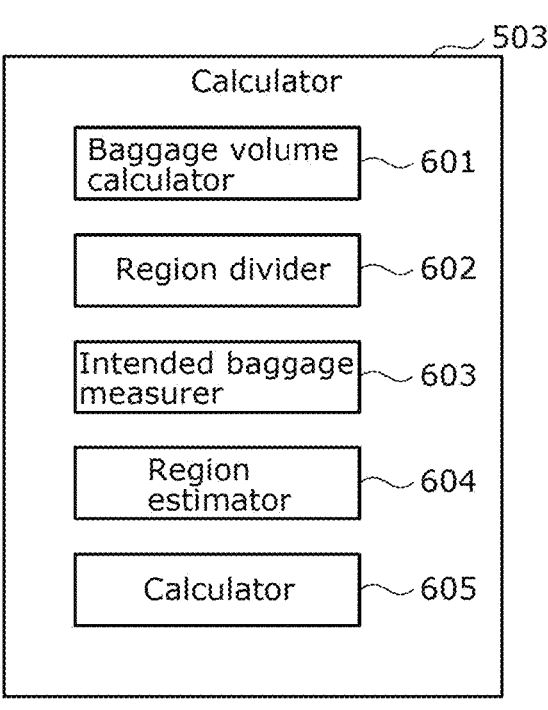
FIG. 26 is a block diagram illustrating an example of a configuration of a calculator of a filling rate calculator according to Variation 1.
Figure 27:
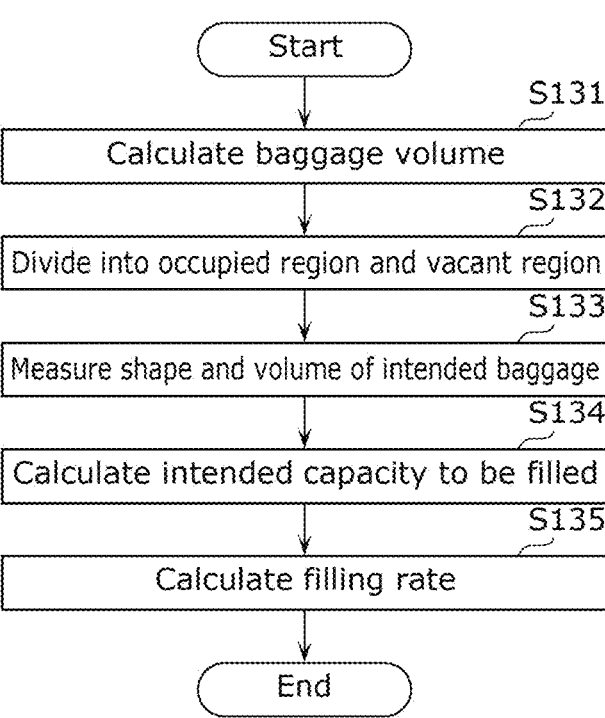
FIG. 27 is a flowchart of a filling rate calculating process by the calculator of the filling rate calculator according to Variation 1.

FIG. 26 is a block diagram illustrating an example of a configuration of a calculator of a filling rate calculator according to Variation 1. FIG. 27 is a flowchart of a filling rate calculating process by the calculator of the filling rate calculator according to Variation 1.

As illustrated in FIG. 26, calculator 503 includes baggage volume calculator 601, region divider 602, intended baggage measurer 603, region estimator 604, and calculator 605.

Baggage volume calculator 601 calculates a baggage volume, which is a volume of baggage 103, from baggage model 2034 (S131). Baggage volume calculator 601 calculates the volume of baggage 103 stored in storage space 101 by the same method as in Embodiment 1.

Next, region divider 602 divides storage space 101 in the space three-dimensional model 2011 into occupied region

2041 that is occupied by baggage 103 and vacant region 2042 that is not occupied by baggage 103 (S132).

Next, intended baggage measurer 603 calculates a volume of one piece of baggage that is intended to be stored (S133). In a case where pieces of baggage intended to be stored are of types in shape and size as illustrated in (c) of FIG. 25, intended baggage measurer 603 calculates a volume of one piece of baggage based on its type. For example, intended baggage measurer 603 calculates a volume of a piece of baggage 103$a$, a volume of a piece of baggage 103$b$, and a volume of a piece of baggage 103$c$.

Next, region estimator 604 estimates a disposing method that enables pieces of baggage 103 intended to be stored the most in vacant region 2042 and estimates the number of pieces of baggage 103 intended to be stored in this case. That is, region estimator 604 estimates a maximum number of storable pieces of baggage 103 intended to be stored in vacant region 2042. Region estimator 604 calculates a capacity of vacant region 2042 capable of storing baggage by multiplying the volume of one piece of baggage by the number of storable pieces of baggage (S134).

In a case where there are types of baggage, region estimator 604 may estimate the number of pieces of baggage that can be stored for each type or may estimate the numbers of pieces of baggage of the types in combination. In a case where pieces of baggage of the types are stored in combination, region estimator 604 calculates an integrated value of a capacity obtained by multiplying a volume of one piece of baggage of each type by the number of storable pieces of baggage of the type, as a capacity of vacant region 2042 capable of storing baggage. For example, when estimating that number $n1$ of pieces of baggage 103$a$, number $n2$ of pieces of baggage 103$b$, and number $n3$ of pieces of baggage 103$c$ are storable, region estimator 604 calculates an integrated value of a first volume resulting from multiplying a volume of a piece of baggage 103$a$ by $n1$, a second volume resulting from multiplying a volume of a piece of baggage 103$b$ by $n2$, and a third volume resulting from multiplying a volume of a piece of baggage 103$c$ by $n3$, as the capacity of vacant region 2042 capable of storing baggage. It should be noted that $n1$, $n2$, and $n3$ are each an integer larger than or equal to zero.

Calculator 605 calculates the filling rate by substituting the volume of baggage already stored and the capacity capable of storing baggage into Equation 2 shown below (S135).

filling rate (%)=(volume of baggage already stored)/
(volume of baggage already stored+capacity
capable of storing baggage)×100      Equation 2

As seen from the above, filling rate calculator 224 may calculate the proportion of the volume of baggage 103 stored in storage space 101 with respect to the capacity of an available space for storing baggage 103 in storage space 101, as the filling rate.

This enables the calculation of the first filling rate for appropriately determining how many pieces of baggage 103 can be stored in a vacant space of storage space 101.

When a type of baggage stored in storage space 101 is already known, it is possible to calculate a quantity of the stored baggage by subtracting a volume of baggage of the known type from a volume of the stored baggage. For example, a type of baggage stored in storage space 101 may be stored together with identification (ID) for identifying rack 102 having storage space 101, in storage 225 of information processing device 220. Storage 225 may store storage information in which the ID for identifying rack 102 is associated with the type of the baggage stored in storage space 101 of rack 102. Furthermore, storage 225 of information processing device 220 may store baggage information in which each baggage type is associated with a volume of baggage of the baggage type. The volume of each baggage type in the baggage information is a volume calculated based on baggage sizes that are commonly used in the distribution industry. The storage information and the baggage information are, for example, tables. Thereby, information processing device 220 can determine a type of baggage 103 stored in storage space 101 of rack 102 and a volume of a baggage type of baggage 103 based on the storage information stored in storage 225, and substrate the determined volume from a calculated volume of the stored baggage in order to calculate a quantity of the stored baggage.

The calculated quantity of the baggage may be outputted with the filling rate. For example, when the stored baggage is baggage 103*a*, it is possible to calculate a quantity of the stored baggage by subtracting a volume of baggage 103*a* from a volume of the stored baggage.

Variation 2

Information processing device 220 according to the embodiments described above is configured to calculate the filling rate of baggage 103 with respect to storage space 101 of one rack 102, but a filling rate of baggage 103 with respect to storage spaces 101 of two or more racks 102.

Figures 28, 29:
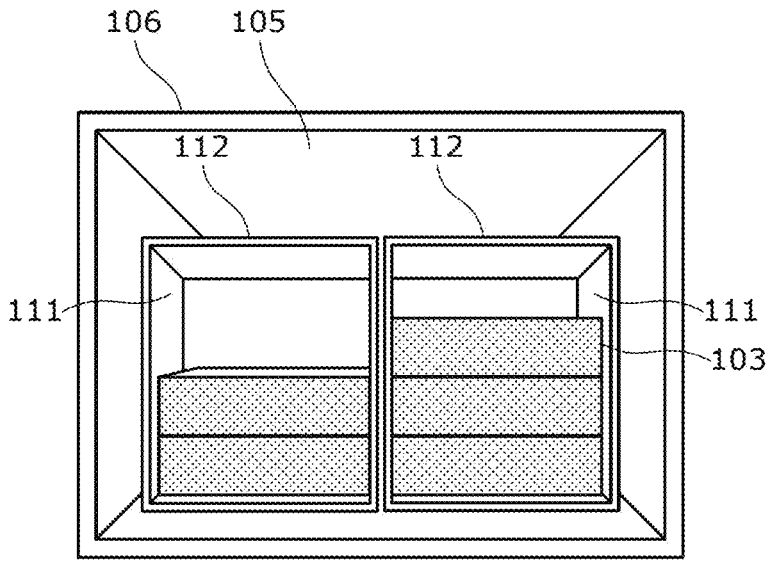
FIG. 28 is a diagram illustrating an example of a case where two or more racks are stored in a storage space such as a platform of a truck.
FIG. 29 is a table showing a relation between racks stored in a storage space on a platform and their filling rates.

FIG. 28 is a diagram illustrating an example of a case where two or more racks are stored in a storage space such as a platform of a truck. FIG. 29 is a table showing a relation between racks stored in the storage space on the platform and their filling rates.

As illustrated in FIG. 28, in platform 106 including storage space 105, cage carriages 112 are stored. Platform 106 may be a van-body type platform of a truck. Platform 106 is an example of a second storage. The second storage is not limited to platform 106 and may be a container or a storehouse.

Storage space 105 is an example of a second storage space. Storage space 105 has a capacity of a size that allows cage carriages 112 to be stored. In Variation 2, storage space 105 is capable of storing six cage carriages 112. Being capable of storing cage carriages 112, storage space 105 is larger than storage spaces 111.

Cage carriages 112 each have storage space 111 that is capable of storing pieces of baggage 103. Cage carriage 112 is an example of the storage. The storage in Variation 2 may be any movable container, and is not limited to cage carriage 112 or a roll box pallet. Storage space 111 is an example of the storage space. In storage space 105, rack 102 described in Embodiment 1 may be stored.

The pieces of baggage 103 are not directly stored in platform 106 by stored in cage carriages 112. Cage carriages 112 storing the pieces of baggage 103 are stored in platform 106.

A configuration of calculator 503 of filling rate calculator 224 in this case will be described.

Figure 30:
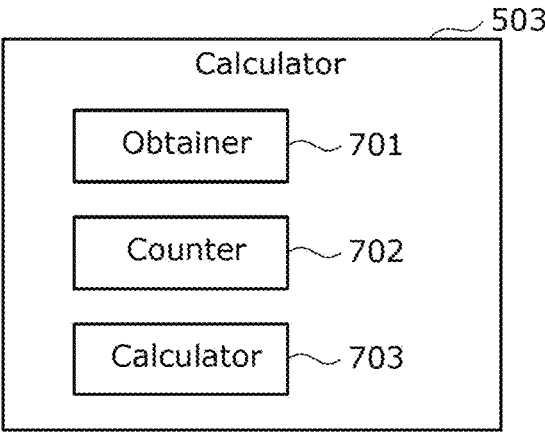
FIG. 30 is a block diagram illustrating an example of a configuration of a calculator of a filling rate calculator according to Variation 2.
Figure 31:
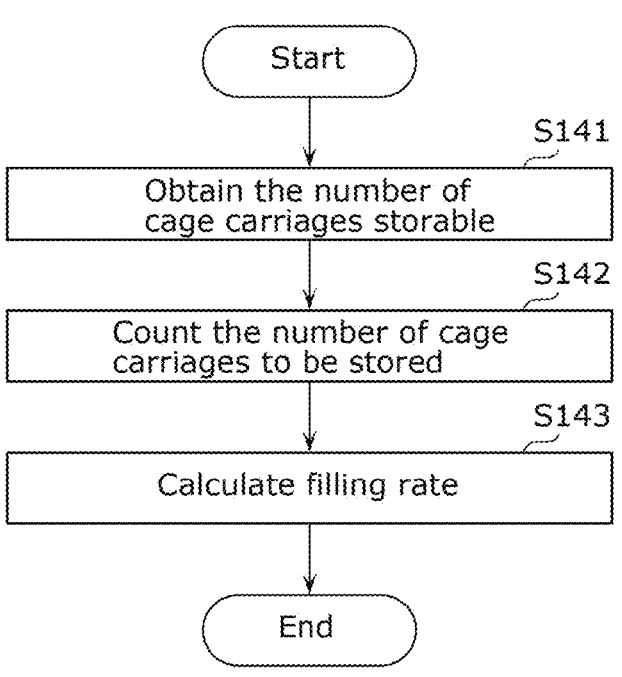
FIG. 31 is a flowchart of a filling rate calculating process by the calculator of the filling rate calculator according to Variation 2.

FIG. 30 is a block diagram illustrating an example of a configuration of a calculator of a filling rate calculator according to Variation 2. FIG. 31 is a flowchart of a filling rate calculating process by the calculator of the filling rate calculator according to Variation 2.

As illustrated in FIG. 30, calculator 503 according to Variation 2 includes obtainer 701, counter 702, and calculator 703.

Obtainer 701 obtains the number of cage carriages 112 that are storable in platform 106 (S141). In a case of Variation 2, a maximum number of cage carriages 112 storable in platform 106 is six, and thus obtainer 701 obtains six.

Counter 702 counts the number of cage carriages 112 to be stored in platform 106 (S142). In a case where cage carriages 112 illustrated in FIG. 28 are stored in platform 106, counter 702 takes three as the count of the number of cage carriages 112.

Calculator 703 calculates a second filling rate, which is a filling rate of one or more cage carriages 112 with respect to platform 106 (S143). Specifically, calculator 703 may calculate, as the second filling rate, a proportion of the number of cage carriages 112 stored in platform 106 with respect to a maximum number of cage carriages 112 storable in platform 106. For example, up to six cage carriages 112 are storable in platform 106, and three cage carriages 112 out of six are stored in platform 106, and thus calculator 703 calculates 50% as the second filling rate.

It should be noted that calculator 703 may calculate a filling rate of baggage 103 with respect to each of one or more cage carriages 112 stored in platform 106 and calculate, using the calculated filling rate, a filling rate of baggage 103 with respect to second storage space. Specifically, calculator 703 may calculate an average of filling rates of baggage 103 with respect to cage carriages 112 as the filling rate of baggage 103 with respect to the second storage space. In this case, when there is a remaining available space for storing cage carriages 112 in storage space 105 of platform 106, calculator 703 may calculate the average assuming that a filling rate of cage carriages 112 of the number of cage carriages 112 storable in the remaining space capable of storing cage carriages 112 is 0%.

For example, in a case where filling rates of three cage carriages 112 illustrated in FIG. 29 are 70%, 30%, and 20%, and six cage carriages 112 are storable in platform 106 at the maximum, filling rates of the six cage carriages 112 may be given as 70%, 30%, 20%, 0%, 0%, and 0%, and a result of determining their average, 20%, may be calculated as the filling rate of baggage 103 with respect to the second storage space.

This enables the second filling rate in a case where one or more cage carriages 112 are stored in storage space 105 to be calculated appropriately.

Variation 3

Next, Variation 3 will be described.

Figure 32:
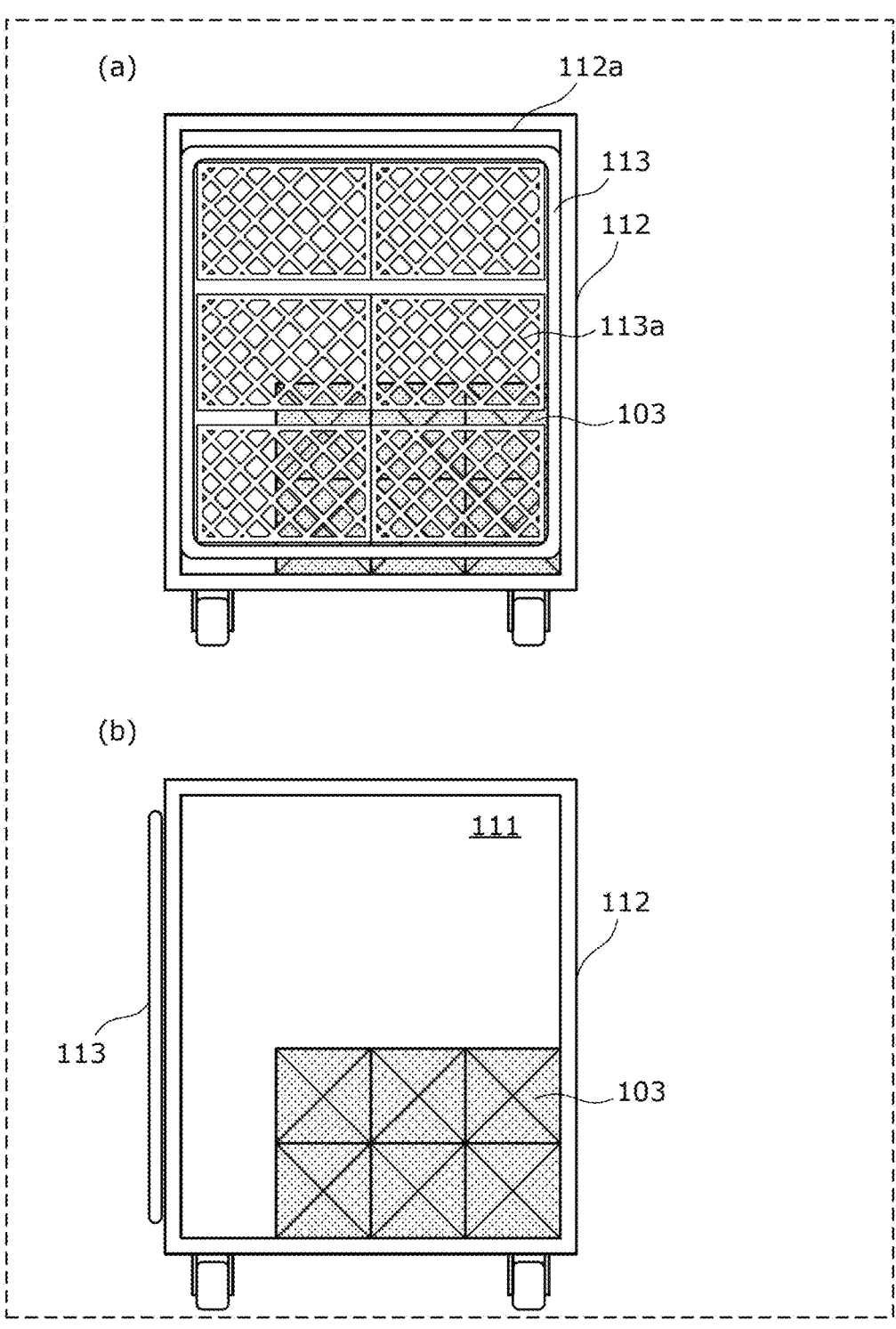
FIG. 32 is a diagram for describing a configuration of a cage carriage according to Variation 3.

FIG. 32 is a diagram for describing a configuration of a cage carriage according to Variation 3.

In FIG. 32, (a) is a diagram illustrating cage carriage 112 of which cover part 113 that is opened and closed is in a closed state. In FIG. 32, (b) is a diagram illustrating cage carriage 112 of which cover part 113 is in an open state.

Cage carriage 112 according to Variation 3 includes cover part 113 that opens and closes opening 112*a*. Cover part 113 is a lattice-like or mesh-like cover having through holes 113*a*. Therefore, even when cover part 113 of cage carriage 112 is in the closed state, range sensor 210 can measure a three-dimensional shape of an inside of storage space 111 of cage carriage 112 via through holes 113*a* and opening 112*a*.

This is because electromagnetic waves emitted by range sensor 210 pass through through holes 113*a* and opening 112*a*. It should be noted that, in a case of range sensor 210A, an infrared pattern emitted by range sensor 210A passes through through holes 113*a* and opening 112*a*, and thus, even when cover part 113 of cage carriage 112 is in the closed state, the three-dimensional shape of the inside of storage space 111 of cage carriage 112 can be measured via through holes 113*a* and opening 112*a*. Further, in a case of range sensor 210B, two cameras 211B and 212B are capable of imaging the inside of storage space 111 via through holes 113a and opening 112a, and thus the three-dimensional shape of the inside of storage space 111 of cage carriage 112 can be measured.

Information processing device 220 therefore can determine whether baggage 103 is stored in storage space 111. However, it is difficult to calculate a correct filling rate unless a method of calculating a filling rate is switched to another method between a case where cover part 113 is in the closed state and a case where cover part 113 is in the open state or a case where cover part 113 is not provided. Thus, filling rate calculator 224 according to Variation 3 calculates a filling rate by a first method when cover part 113 is in the open state and calculates a filling rate by a second method when cover part 113 is in the closed state.

Figure 33:
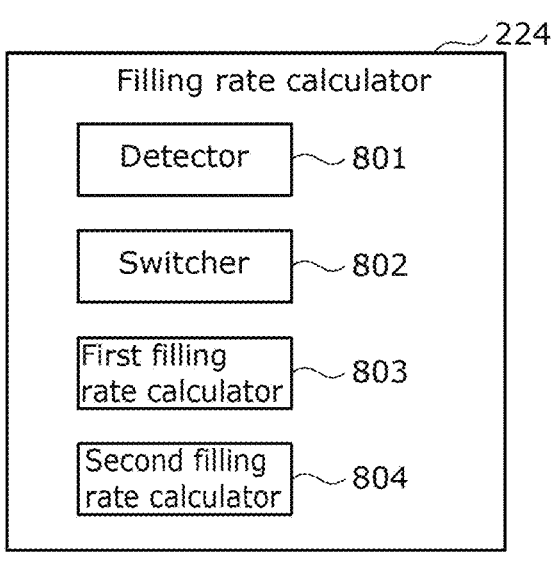
FIG. 33 is a block diagram illustrating an example of a configuration of a filling rate calculator according to Variation 3.
Figure 34:
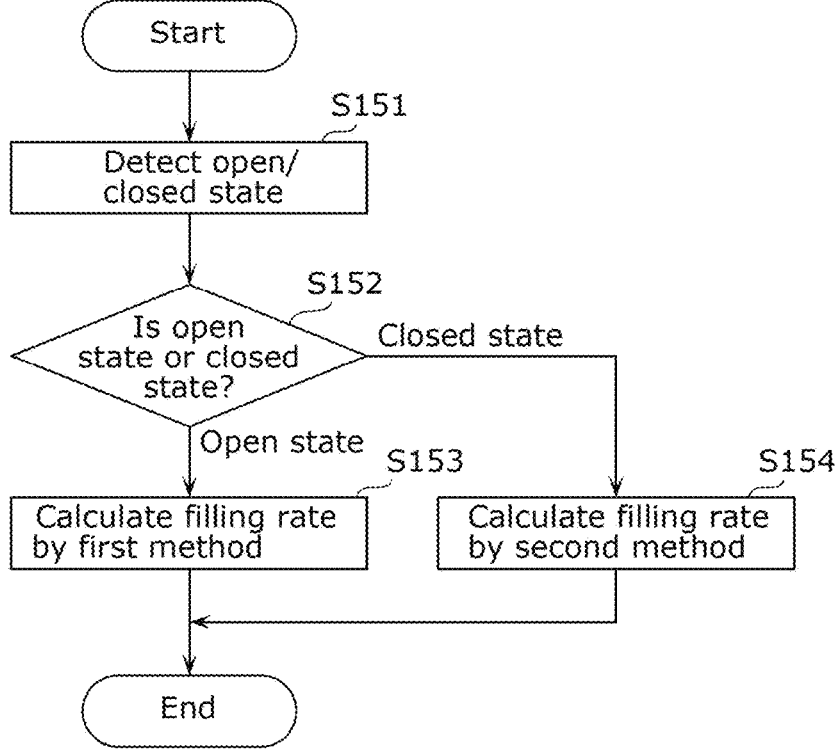
FIG. 34 is a flowchart of a filling rate calculating process by the filling rate calculator according to Variation 3.

FIG. 33 is a block diagram illustrating an example of a configuration of a filling rate calculator according to Variation 3. FIG. 34 is a flowchart of a filling rate calculating process by the filling rate calculator according to Variation 3.

As illustrated in FIG. 33, filling rate calculator 224 according to Variation 3 includes detector 801, switcher 802, first filling rate calculator 803, and second filling rate calculator 804.

Detector 801 detects an open/closed state of cover part 113 using a space three-dimensional model (S151). Specifically, using the space three-dimensional model, detector 801 detects that cover part 113 is in the closed state when three-dimensional point clouds are present at positions inside and outside storage space 111 in a front-back direction of a region of opening 112a of cage carriage 112 (i.e., a direction in which range sensor 210 and cage carriage 112 are arranged). When a three-dimensional point cloud is present only inside storage space 111, detector 801 detects that cover part 113 is in the open state.

Switcher 802 determines whether cover part 113 is in the open state or the closed state (S152), and switches between the following processes according to a result of the determination.

When cover part 113 is determined to be in the open state by switcher 802 (Open state in S152), first filling rate calculator 803 calculates a filling rate by the first method (S153). Specifically, first filling rate calculator 803 calculates a filling rate of cage carriage 112 by performing the same process as the process by filling rate calculator 224 in Embodiment 1.

When cover part 113 is determined to be in the closed state by switcher 802 (Closed state in S152), second filling rate calculator 804 calculates a filling rate by the second method (S154). The second method will be described in detail with reference to FIG. 35.

Figure 35:
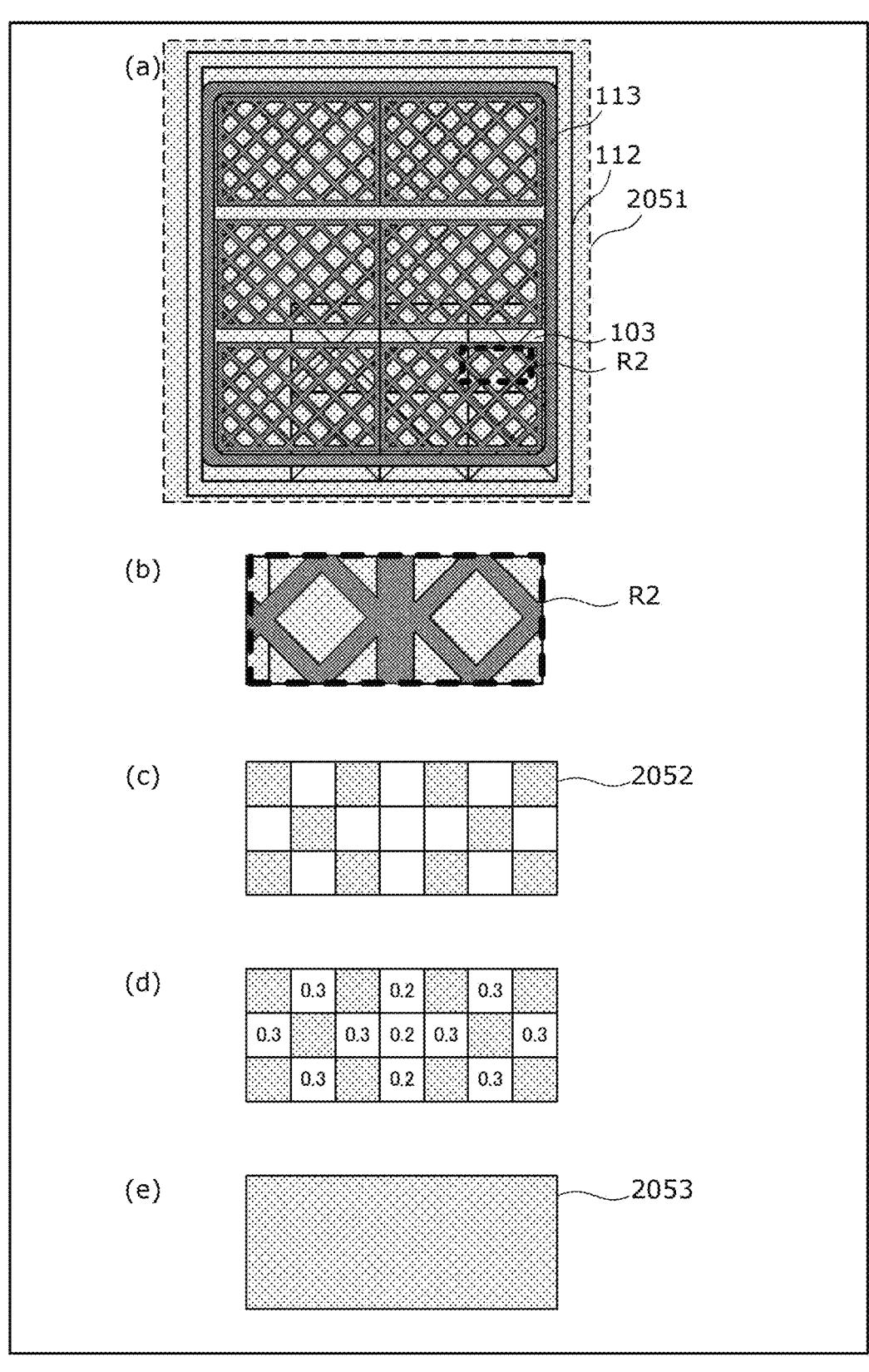
FIG. 35 is a diagram for describing an example of a second method for calculating a filling rate.

FIG. 35 is a diagram for describing an example of the second method for calculating a filling rate.

As illustrated in (a) of FIG. 35, consider a case where space three-dimensional model 2051 is obtained.

In FIG. 35, (b) is a diagram of region R2 in space three-dimensional model 2051 in an enlarged manner. As illustrated in (b) of FIG. 35, second filling rate calculator 804 classifies region R2 into a second portion where cover part 113 is detected and a first portion where baggage 103 is detected.

The first portion is a region including a three-dimensional point cloud on a back side of a region of opening 112a. In addition, the first portion is a portion through which range sensor 210 faces baggage 103 in a direction from range sensor 210 to baggage 103. That is, the first portion is a portion that faces through holes 113a in cover part 113 in the closed state in the direction from range sensor 210 to baggage 103. It should be noted that cover part 113 may have a configuration having one through hole 113a.

The second portion is a region including a three-dimensional point cloud on a front side of a region of opening 112a of cage carriage 112 in the front-back direction. In addition, the second portion is a portion through which range sensor 210 does not face baggage 103 in a direction from range sensor 210 to baggage 103. That is, the second portion is a portion that is hidden by cover part 113 in the closed state in the direction from range sensor 210 to baggage 103.

Second filling rate calculator 804 converts the first portion and the second portion into voxels, thus generating voxel data 2052 illustrated in (c) of FIG. 35. In voxel data 2052, white regions not hatched are regions where the second portion has been converted into voxels, and dot-hatched regions are regions where the first portion has been converted into voxels.

On the white regions corresponding to regions of cover part 113, second filling rate calculator 804 then estimates whether baggage 103 is present on the back side of cover part 113. Specifically, in regions where the conversion into voxels has been carried out, second filling rate calculator 804 assigns a score based on a probability that the baggage is present to each of 26 voxels adjacent to a dot-hatched voxel, where baggage 103 is present. Then, additional scores are assigned to voxels illustrated as white regions adjacent to voxels where baggage 103 is present. Second filling rate calculator 804 performs this on all voxels where baggage 103 is present and determines that baggage 103 is present in voxels illustrated as white regions each of which has a total value of the scores being greater than or equal to a given threshold value. For example, when the given threshold value is assumed to be 0.1, second filling rate calculator 804 determines that baggage 103 is present in all the regions, and thus, as illustrated in (e) of FIG. 35, baggage model 2053 into which a shape of a region concealed by cover part 113 is estimated can be calculated.

In this manner, information processing device 220 estimates a shape of the second portion through which range sensor 210 does not face a measurement target based on a shape of the first portion through which the range sensor faces baggage 103, and thus, even in a case where the second portion is present, a target three-dimensional model can be estimated appropriately.

Figure 36:
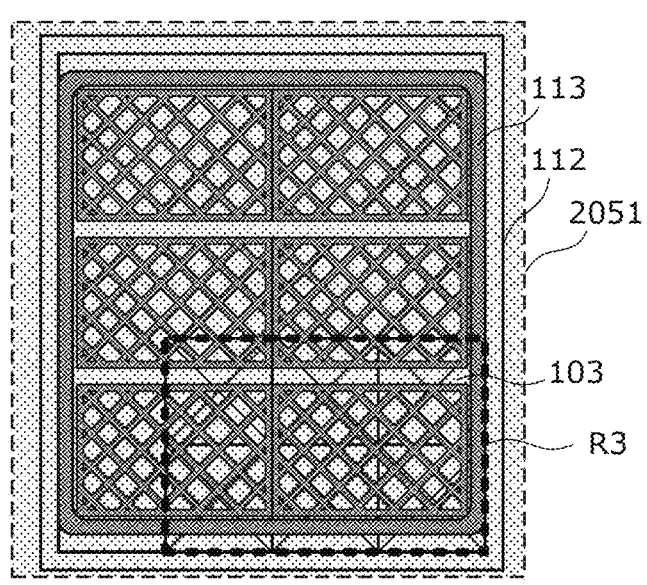
FIG. 36 is a diagram for describing another example of a second method for calculating a filling rate.

In a case where there is a rule that pieces of baggage 103 are to be closely disposed inside cage carriage 112, second filling rate calculator 804 may extract, as illustrated in FIG. 36, contour R3 of a region where one or more pieces of baggage 103 are disposed and may determine that pieces of baggage 103 are present inside extracted contour R3. Then, second filling rate calculator 804 may estimate a region of cover part 113 inside contour R3 using a three-dimensional point cloud in a region of through holes 113a of cover part 113.

In a filling rate measurement method according to Variation 3, cage carriage 112 further has through holes 113a and cover part 113 that opens and closes opening 112a. Further, in the filling rate measurement method, whether cover part 113 is in the open state or in the closed state is determined, and when cover part 113 is in the open state, baggage model 2034 is estimated by extraction and estimation as filling rate calculator 224 in Embodiment 1 does. When cover part 113 is in the closed state, filling rate calculator 224 estimates second portions hidden by cover part 113 based on first portions corresponding to through holes 113a of cover part 113 in voxel data 2031 based on space three-dimensional model 2011 and estimates baggage model 2034 using the first portions, the estimated second portions, and storage three-dimensional model 2032.

According to this, even in a case where pieces of baggage 103 are stored in cage carriage 112 provided with cover part 113 that opens and closes opening 112a, the method for estimating baggage model 2034 is switched between the first method and the second method according to the open/closed state of cover part 113, and thus a target three-dimensional model can be estimated appropriately.

Variation 4

Figures 37, 38:
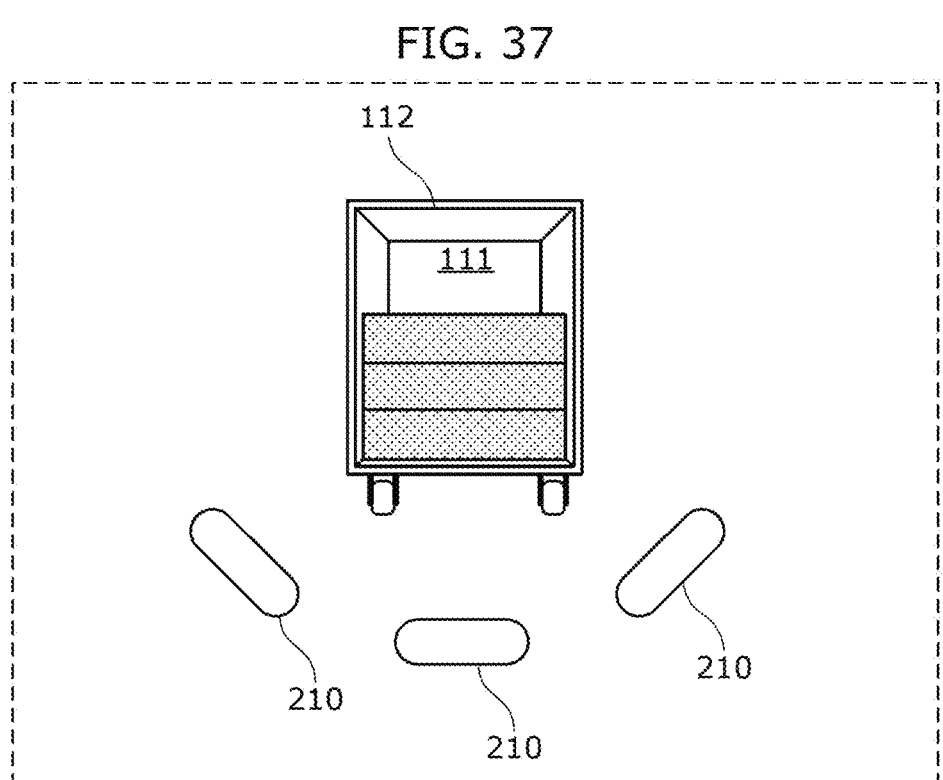
FIG. 37 is a diagram for describing a method for generating a space three-dimensional model according to Variation 4.
FIG. 38 is a diagram for describing a method for generating a space three-dimensional model according to Variation 5.

FIG. 37 is a diagram for describing a method for generating a space three-dimensional model according to Variation 4.

As illustrated in FIG. 37, in a case where a space three-dimensional model is generated, three-dimensional measurement system 200 may integrate results of measurement by range sensors 210 together as in the processing by model generator 223. In this case, three-dimensional measurement system 200 determines positions and orientations of range sensors 210 by performing calibration in advance and integrates obtained results of measurement together based on the determined positions and orientations of range sensors 210, so that a space three-dimensional model including a three-dimensional point cloud with little occlusion can be generated.

Variation 5

Figure 39:
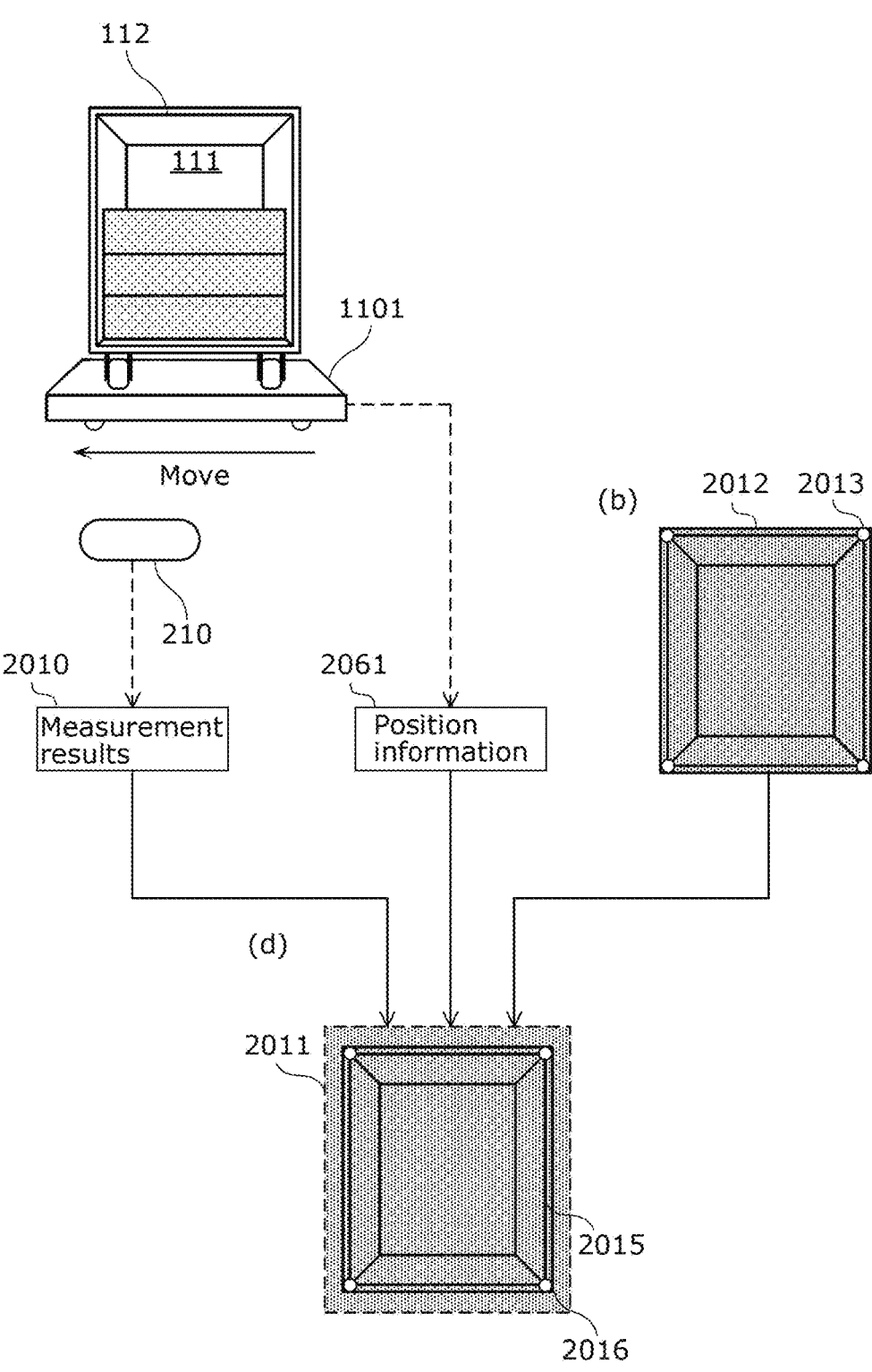
FIG. 39 is a diagram for describing a method for generating a space three-dimensional model according to Variation 5.

Each of FIGS. 38 and 39 is a diagram for describing a method for generating a space three-dimensional model according to Variation 5.

As illustrated in FIG. 38, in a case where a space three-dimensional model is generated, three-dimensional measurement system 200 may cause at least one of cage carriage 112 and one range sensor 210 to move in such a manner as to traverse measurement region R1 of one range sensor 210, and results of measurement obtained by range sensor 210 at timings during the movement may be integrated together. Cage carriage 112 may move across measurement region R1 of range sensor 210 by being transported by Automated Guided Vehicle (AGV) 1101, for example.

In this case, information processing device 220 calculates a relative position and a relative orientation between cage carriage 112 and one range sensor 210 at the timings at which the measurement results are measured. For example, as illustrated in FIG. 39, information processing device 220 obtains measurement results 2010 from range sensor 210 and obtains position information 2061 on automatic guided vehicle 1101 from automatic guided vehicle 1101. Measurement results 2010 includes a first measurement result measured by range sensor 210 at a first timing and a second measurement result measured by range sensor 210 at a second timing. The first timing and the second timing are timings different from each other. Position information 2061 includes a first position of automatic guided vehicle 1101 at the first timing and a second position of automatic guided vehicle 1101 at the second timing. The first position and the second position are positions different from each other. Position information 2061 includes carrier positions of automatic guided vehicle 1101 at a plurality of timings. The carrier positions are estimated by automatic guided vehicle 1101.

The carrier positions can be estimated by a conventional method. For example, automatic guided vehicle 1101 may be placed at a specific position and may estimate that automatic guided vehicle 1101 is at the specific position by reading specific position information that indicates the specific position, from a marker or a tag including the specific position information. Automatic guided vehicle 1101 may estimate the carrier position based on a distance and a direction of traveling with respect to the specific position estimated by reading the specific position information from a marker or a tag. Automatic guided vehicle 1101 may transmit the read specific position information, and the distance and the direction of traveling from the specific position to information processing device 220, and information processing device 220 may estimate a position of automatic guided vehicle 1101 based on the specific position information and the distance and the direction of traveling from the specific position. The position of automatic guided vehicle 1101 may be estimated using an image captured by a camera that is disposed outside automatic guided vehicle 1101.

Based on position information 2061 and measurement results 2010 including a plurality of measurement results obtained by measuring cage carriage 112 from different viewpoints, information processing device 220 extracts four opening endpoints 2016, which are positions of four corners of openings 2015 in rack region 2014. Based on the first position included in position information 2061, information processing device 220 may identify, in the first measurement result, a region where there is a high possibility that opening 112a of cage carriage 112 is present and may perform a process of calculating a measurement coordinate system on the identified region. Based on the second position included in position information 2061, information processing device 220 may identify, in the second measurement result, a region where there is a high possibility that opening 112a of cage carriage 112 is present and may perform a process of calculating a measurement coordinate system on the identified region.

Based on the first position and the second position included in position information 2061, information processing device 220 may integrate the first measurement result and the second measurement result to generate a space three-dimensional model including a three-dimensional point cloud with little occlusion. This enables calculation of the filling rate with higher accuracy.

It should be noted that position information 2061 may include only one position at a specific timing, and measurement results 2010 may include only one measurement result at the specific timing.

In a case where a plurality of automatic guided vehicles passes through measurement region R1 of range sensor 210 one by one, information processing device 220 may calculate a filling rate of each of cage carriages 112 carried by the automatic guided vehicles passing through one by one, based on measurement results of cage carriages 112 carried by the automatic guided vehicles obtained for cage carriages 112.

Variation 6

In Variation 6, the measurement region of the range sensor will be described.

Figure 40:
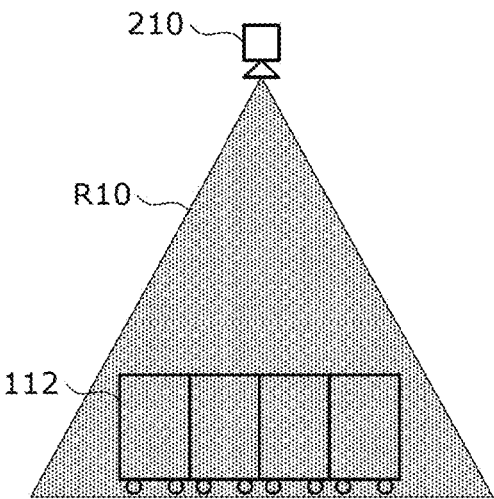
FIG. 40 is a diagram illustrating an example of measuring a plurality of cage carriages with one range sensor.

FIG. 40 is a diagram illustrating an example of measuring a plurality of cage carriages with one range sensor.

As illustrated in FIG. 40, one range sensor 210 is disposed such that measurement region R10 of this range sensor 210 includes all of a plurality of cage carriages 112 that are measurement targets. For example, range sensor 210 may be disposed at a position at which a maximum length of measurement region R10 in a measuring direction includes farther faces of cage carriages 112 from range sensor 210.

Figure 41:
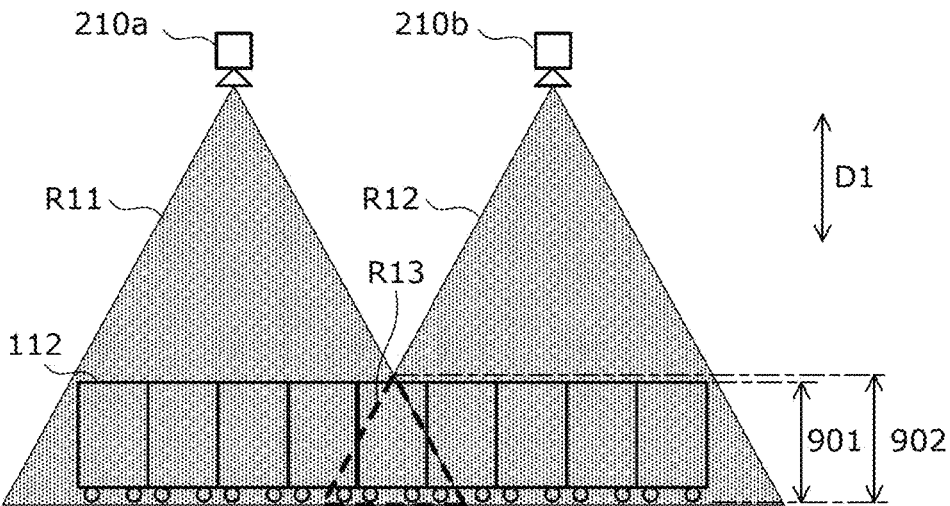
FIG. 41 is a diagram illustrating an example of measuring a plurality of cage carriages with two range sensors.

FIG. 41 is a diagram illustrating an example of measuring a plurality of cage carriages with two range sensors.

As illustrated in FIG. 41, two range sensors 210*a* and 210*b* are disposed such that measurement regions R11 and R12 of these range sensors 210*a* and 210*b* include a range where a plurality of cage carriages 112 that are measurement targets are present. In addition, two range sensors 210*a* and 210*b* are disposed such that, for example, overlapping region R13 where measurement region R11 and measurement region R12 overlap each other has length 902 in measurement direction D1 that is greater than length 901 of cage carriages 112 in measurement direction D1. Length 901 and length 902 are lengths (heights) in measurement direction D1 based on a placement surface of cage carriages 112. That is, overlapping region R13 has length 902 that is greater than or equal to length 901 of cage carriages 112 in measurement direction D1. This can maximize the number of the plurality of cage carriages 112 that are measurable with two range sensors 210*a* and 210*b*. It should be noted that measurement direction D1 is a direction in which each of range sensors 210*a* and 210*b* perform measuring. Although measurement direction D1 extends along a vertical direction in FIG. 40 and FIG. 41, a direction along which measurement direction D1 extends is not limited to the vertical direction. Measurement direction D1 may extend along a horizontal direction.

Range sensors 210*a* and 210*b* are sensors that are the same as range sensor 210 illustrated in FIG. 40, and the measurement regions of range sensors 210*a* and 210*b* have the same size as the measurement region of range sensor 210. In FIG. 40, up to four cage carriages 112 are measurable for one range sensor 210. In FIG. 41, one additional cage carriage 112 can be placed by placing two range sensors 210*a* and 210*b* in such a manner that height 902 of overlapping region R13 is higher than height 901 of cage carriages 112 as described above. As a result, nine cage carriages 112 can be measured with two range sensors 210*a* and 210*b*. Therefore, cage carriages 112 that outnumber a double of the number of cage carriages 112 measurable with one range sensor 210 can be measured.

Figure 42:
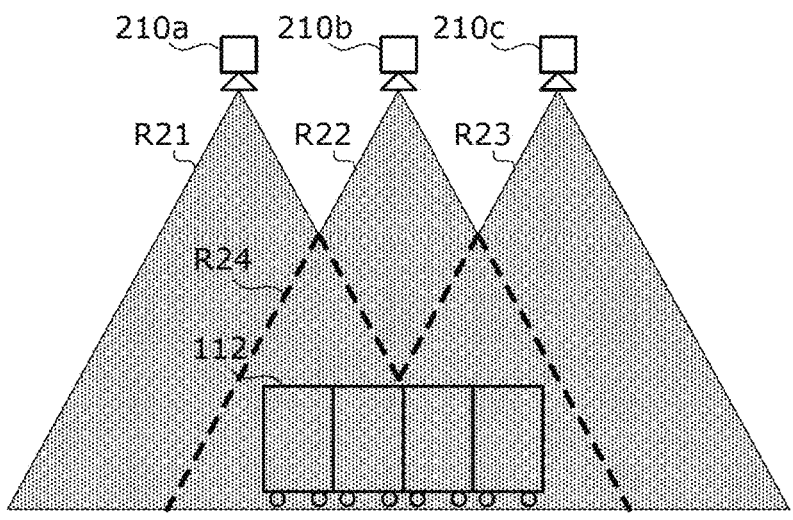
FIG. 42 is a diagram illustrating an example of measuring a plurality of cage carriages with three range sensors.

FIG. 42 is a diagram illustrating an example of measuring a plurality of cage carriages with three range sensors.

As illustrated in FIG. 42, three range sensors 210*a*, 210*b*, and 210*c* are disposed such that measurement regions R21, R22, and R23 of these range sensors 210*a*, 210*b*, and 210*c* include all of a plurality of cage carriages 112 that are measurement targets. In addition, three range sensors 210*a*, 210*b*, and 210*c* are disposed such that, for example, overlapping region R24 where at least two of measurement region R21, measurement region R22, and measurement region R23 are overlapped includes all of the plurality of cage carriages 112 that are measurement targets. All of the plurality of cage carriages 112 are thereby measured by the plurality of range sensors. Therefore, a space three-dimensional model including a three-dimensional point cloud with little occlusion can be generated.

Variation 7

Three-dimensional measurement system 200A according to Variation 7 will be described.

Figure 43:
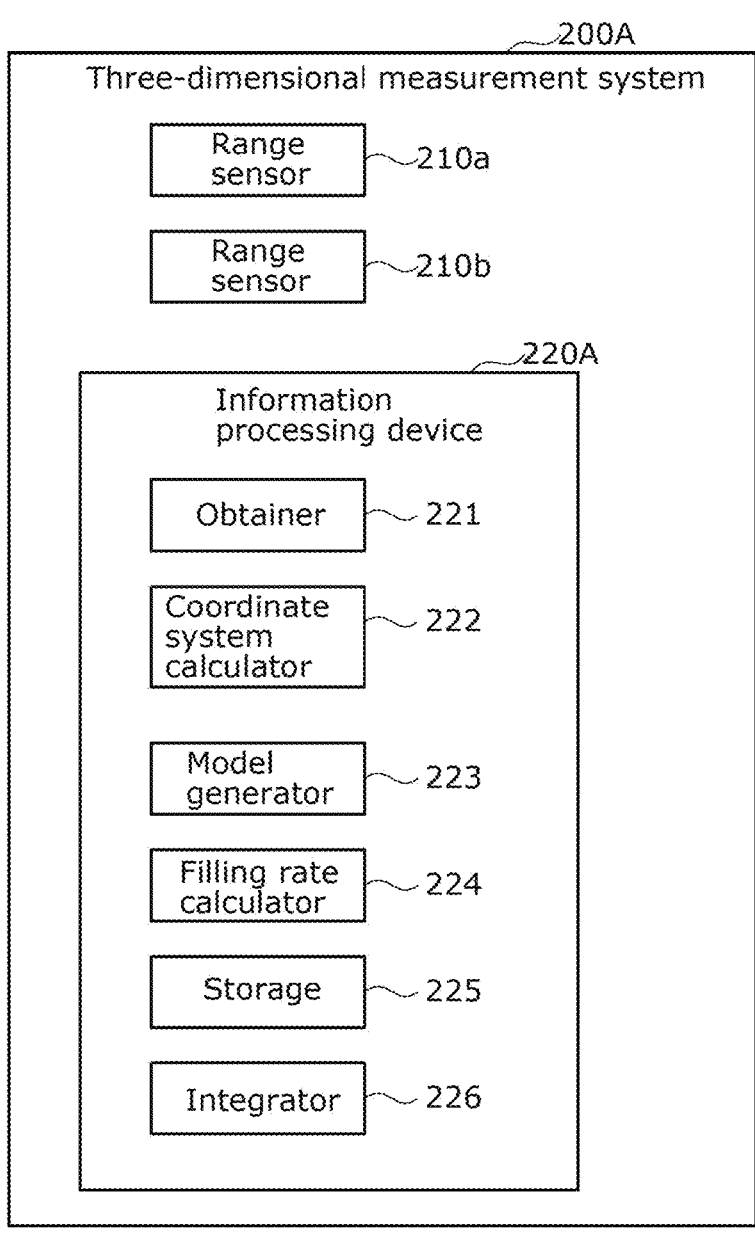
FIG. 43 is a block diagram illustrating a characteristic configuration of a three-dimensional measurement system according to Variation 7.

FIG. 43 is a block diagram illustrating a characteristic configuration of the three-dimensional measurement system according to Variation 7.

Three-dimensional measurement system 200A according to Variation 7 differs from three-dimensional measurement system 200 in Embodiment 1 in that three-dimensional measurement system 200A includes two range sensors 210*a* and 210*b*. In addition, information processing device 220A according to Variation 7 differs in that information processing device 220A further includes integrator 226 in addition to the constituent components of information processing device 220 according to Embodiment 1. Here, description will be given mainly of regards different from Embodiment 1.

Obtainer 221 obtains measurement results from the plurality of range sensors 210*a* and 210*b*. Specifically, obtainer 221 obtains a first measurement result by range sensor 210*a* and a second measurement result by range sensor 210*b*. The first measurement result includes a first space three-dimensional model that is generated by range sensor 210*a*. The second measurement result includes a second space three-dimensional model that is generated by range sensor 210*b*.

Integrator 226 integrates together the first space three-dimensional model and the second space three-dimensional model. Specifically, integrator 226 integrates together the first space three-dimensional model and the second space three-dimensional model based on a position and an orientation (external parameters) of range sensor 210*a* and a position and an orientation (external parameters) of range sensor 210*b* stored in storage 225. Integrator 226 thus generates an integrated space three-dimensional model. The position and the orientation of range sensor 210*a* and the position and the orientation of range sensor 210*b* stored in storage 225 are generated by calibration that is performed in advance.

Coordinate system calculator 222, model generator 223, and filling rate calculator 224 perform the processing described in Embodiment 1 using the integrated space three-dimensional model as the space three-dimensional model.

Figure 44:
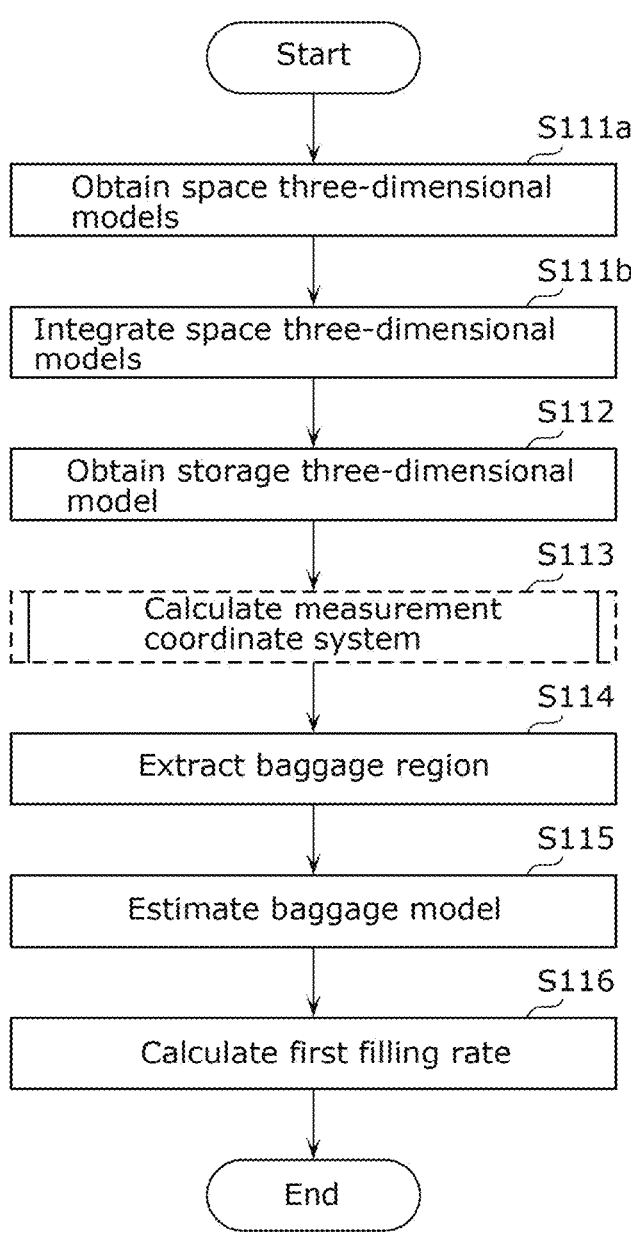
FIG. 44 is a flowchart of a filling rate measurement method performed by an information processing device according to Variation 7.

FIG. 44 is a flowchart of a filling rate measurement method performed by the information processing device according to Variation 7.

Information processing device 220A obtains a plurality of space three-dimensional models from range sensors 210*a* and 210*b* (S111*a*). The plurality of space three-dimensional models include a first space three-dimensional model and a second space three-dimensional model. At this time, information processing device 220A may further obtain images of a measurement target from range sensors 210*a* and 210*b*.

Information processing device 220A integrates together the plurality of space three-dimensional models to generate an integrated space three-dimensional model (S111*b*).

Information processing device 220A obtains a storage three-dimensional model stored in storage 225 (S112).

Steps S113 to S116 are the same processes as in Embodiment 1 except that the integrated space three-dimensional model is used in place of the space three-dimensional model. Therefore, description of steps S113 to S116 will be omitted.

Variation 8

Although information processing device 220 according to Embodiment 2 is configured to detect line segments from two-dimensional images including an RGB image and a depth image and identify line segments of a shape of an opening in a storage three-dimensional model from the detected line segments, identifying the line segments of a shape of an opening based on the two-dimensional images is not limitative. Information processing device 220 may identify line segments (edges) of a shape of an opening from a measurement result or a space three-dimensional model by range sensor 210. For example, from the measurement result or the space three-dimensional model by range sensor 210, information processing device 220 may detect, as line segments, a three-dimensional point cloud that is arranged along a certain direction at intervals of shorter than or equal to a certain length and that is more than certain number, and may identify, from the detected line segments, the line segments of a shape of an opening in a storage three-dimensional model.

Other Embodiments

Although the filing rate measurement method and the like according to the present disclosure have been described based on the above embodiments, the present disclosure is not limited to the embodiments.

For example, in the above embodiments, each processing unit included in the information processing device is implemented to a CPU and a control program. For example, the constituent elements of each processing unit may be implemented to one or more electronic circuits. Each of the one or more electronic circuits may be a general-purpose circuit or a dedicated circuit. The one or more electronic circuits may include, for example, an Integrated Circuit (IC), a Large Scale Integration (LSI), and the like. The IC or LSI may be integrated to a single chip or integrated to a plurality of chips. Here, the terminology "LSI" or "IC" is used, but depending on the degree of integration, the circuit may also be referred to as a system LSI, a Very Large Scale Integration (VLSI), or an Ultra Large Scale Integration (ULSI). A Field Programmable Gate Array (FPGA) that is programed after manufacturing the LSI may be used for the same purpose.

It should be noted that general or specific aspects of the present disclosure may be implemented to a system, a device, a method, an integrated circuit, or a computer program. The general or specific aspects of the present disclosure may be implemented to a non-transitory computer-readable recording medium such as an optical disk, a Hard Disk Drive (HDD), or a semiconductor memory, on which the computer program is recorded. Furthermore, the general or specific aspects of the present disclosure may be implemented to any combination of the system, the device, the method, the integrated circuit, or the computer program.

In addition, the present disclosure may include embodiments obtained by making various modifications on the above embodiments which those skilled in the art will arrive at, or embodiments obtained by selectively combining the elements and functions disclosed in the above embodiments, without materially departing from the scope of the present disclosure.

INDUSTRIAL APPLICABILITY

The present disclosure is useful as a filling rate measurement method, an information processing device, and a recording medium that are capable of calculating a filling rate of a measurement target.

The invention claimed is:

1. A filling rate measurement method comprising:
   obtaining a space three-dimensional model generated by measuring a first storage including an opening and a first storage space for storing a measurement target, a shape of the opening being an outline of the first storage, the measuring being performed through the opening using a range sensor facing the first storage;
   obtaining a storage three-dimensional model that is a three-dimensional model of the first storage in which the measurement target is not stored;
   obtaining a two-dimensional image of the opening and position orientation information corresponding to the two-dimensional image;

identifying a line segment indicating the shape of the opening in the two-dimensional image, using the storage three-dimensional model;
   calculating a position of the opening in a three-dimensional space, based on the position orientation information and the line segment identified;
   associating a position of the storage three-dimensional model with a position of the space three-dimensional model based on the calculated position of the opening;
   estimating a target three-dimensional model that is a three-dimensional model of the measurement target in the first storage space, based on the storage three-dimensional model and the space three-dimensional model associated with each other; and
   calculating a first filling rate of the measurement target with respect to the first storage space, using the storage three-dimensional model and the target three-dimensional model.

2. The filling rate measurement method according to claim 1, wherein
   the two-dimensional image includes a Red Green Blue (RGB) image generated by imaging the opening by a camera, and
   the position orientation information indicates a position and an orientation of the camera at a time of the imaging of the opening.

3. The filling rate measurement method according to claim 1, wherein
   the two-dimensional image includes a depth image generated based on measuring of the opening by the range sensor, and
   the position orientation information indicates a position and an orientation of the range sensor at a time of the measuring of the opening.

4. The filling rate measurement method according to claim 1, wherein
   the two-dimensional image includes at least one of an RGB image, a grayscale image, an infrared image, or a depth image,
   the RGB image is generated by imaging the opening by a camera, and
   the depth image is generated based on a result of the measuring performed by the range sensor.

5. The filling rate measurement method according to claim 4, wherein
   the two-dimensional image includes the RGB image and the depth image, and
   in the identifying of the line segment, the line segment is identified based on both a line segment identified from the RGB image and a line segment identified from the depth image.

6. The filling rate measurement method according to claim 1, wherein
   the range sensor includes at least one of a Time of Flight (ToF) sensor or a stereo camera.

7. The filling rate measurement method according to claim 1, wherein
   the range sensor includes a first range sensor and a second range sensor, and
   a first measurement region of the first range sensor and a second measurement region of the second range sensor having an overlapping region in which the first measurement region and the second measurement region overlap each other.

8. The filling rate measurement method according to claim 7, wherein the overlapping region has a length greater than or equal to a length of the measurement target in a measuring direction of the range sensor.

9. The filling rate measurement method according to claim 7, wherein the overlapping region includes an entire range in which the measurement target is present.

10. The filling rate measurement method according to claim 1, wherein the first storage moves relative to the range sensor in a direction intersecting a measuring direction of the range sensor, and the space three-dimensional model is generated using a first measurement result measured at a first timing by the range sensor and a second measurement result measured at a second timing by the range sensor.

11. The filling rate measurement method according to claim 1, wherein the position of the storage three-dimensional model and the position of the space three-dimensional model are associated with each other using a rotation matrix and a translational vector.

12. The filling rate measurement method according to claim 1, further comprising:

calculating a second filling rate of one or more of the first storage with respect to a second storage including a second storage space for storing the one or more of the first storage, the second filling rate being calculated in addition to the first filling rate.

13. The filling rate measurement method according to claim 1, further comprising:

calculating a second filling rate of the measurement target stored in each of one or more of the first storage with respect to a second storage including a second storage space for storing the one of more of the first storage, the second filling rate being calculated in addition to the first filling rate.

14. An information processing device comprising:

a processor; and a memory, wherein, using the memory, the processor:

obtains a space three-dimensional model generated by measuring a first storage including an opening and a first storage space for storing a measurement target, a shape of the opening being an outline of the first storage, the measuring being performed through the opening using a range sensor facing the first storage;

obtains a storage three-dimensional model that is a three-dimensional model of the first storage in which the measurement target is not stored;

obtains a two-dimensional image of the opening and position orientation information corresponding to the two-dimensional image;

identifies a line segment indicating the shape of the opening in the two-dimensional image, using the storage three-dimensional model;

calculates a position of the opening in a three-dimensional space, based on the position orientation information and the line segment identified;

associates a position of the storage three-dimensional model with a position of the space three-dimensional model based on the calculated position of the opening;

estimates a target three-dimensional model that is a three-dimensional model of the measurement target in the first storage space, based on the storage three-dimensional model and the space three-dimensional model associated with each other; and calculates a first filling rate of the measurement target with respect to the first storage space, using the storage three-dimensional model and the target three-dimensional model.

15. A non-transitory computer-readable recording medium having recorded thereon a program for causing a computer to perform a filling rate measurement method, the filling rate measurement method including:

obtaining a space three-dimensional model generated by measuring a first storage including an opening and a first storage space for storing a measurement target, a shape of the opening being an outline of the first storage, the measuring being performed through the opening using a range sensor facing the first storage;

obtaining a storage three-dimensional model that is a three-dimensional model of the first storage in which the measurement target is not stored;

obtaining a two-dimensional image of the opening and position orientation information corresponding to the two-dimensional image;

identifying a line segment indicating the shape of the opening in the two-dimensional image, using the storage three-dimensional model;

calculating a position of the opening in a three-dimensional space, based on the position orientation information and the line segment identified;

associating a position of the storage three-dimensional model with a position of the space three-dimensional model based on the calculated position of the opening;

estimating a target three-dimensional model that is a three-dimensional model of the measurement target in the first storage space, based on the storage three-dimensional model and the space three-dimensional model associated with each other; and calculating a first filling rate of the measurement target with respect to the first storage space, using the storage three-dimensional model and the target three-dimensional model.

16. The filling rate measurement method according to claim 1, wherein the association of the position of the storage three-dimensional model to the position of the space three-dimensional model is based on the position of the opening being used as an origin.

* * * * *